(12) United States Patent
Shikanai et al.

(10) Patent No.: US 11,077,904 B2
(45) Date of Patent: Aug. 3, 2021

(54) KNUCKLE GUARD

(71) Applicant: HONDA MOTOR CO., LTD., Tokyo (JP)

(72) Inventors: Shimpei Shikanai, Wako (JP); Jumpei Yasuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/737,948

(22) Filed: Jan. 9, 2020

(65) Prior Publication Data

US 2020/0247496 A1 Aug. 6, 2020

(30) Foreign Application Priority Data

Jan. 31, 2019 (JP) .............................. JP2019-015489

(51) Int. Cl.
*B62J 23/00* (2006.01)
*B62J 27/00* (2020.01)

(52) U.S. Cl.
CPC ............... *B62J 23/00* (2013.01); *B62J 27/00* (2013.01)

(58) Field of Classification Search
CPC .......... B62J 23/00; B62J 27/00; B62K 21/26; B62K 21/12; B62K 11/14
See application file for complete search history.

(56) References Cited

U.S. PATENT DOCUMENTS

| 3,834,249 A | 9/1974 | Bothwell | |
|---|---|---|---|
| 4,141,567 A * | 2/1979 | Scott | B62J 23/00 280/304.3 |
| 2007/0256514 A1 | 11/2007 | Laivins et al. | |
| 2008/0264198 A1 * | 10/2008 | Laivins | B62J 23/00 74/551.8 |
| 2012/0234129 A1 | 9/2012 | Adan | |

FOREIGN PATENT DOCUMENTS

| CN | 101746451 | 6/2010 | |
|---|---|---|---|
| CN | 203255313 | 10/2013 | |
| DE | 202010006315 U1 * | 10/2011 | ............. B62J 27/00 |
| JP | 59-062090 | 4/1984 | |
| JP | 10-297568 | 11/1998 | |
| JP | 2012-096607 | 5/2012 | |
| JP | 2012-250589 | 12/2012 | |
| KR | 10-0933418 | 12/2009 | |

OTHER PUBLICATIONS

Japanese Office Action for Japanese Patent Application No. 2019-015489 dated Oct. 27, 2020.
Chinese Office Action for Chinese Patent Application No. 202010068122.X dated Feb. 23, 2021.

* cited by examiner

*Primary Examiner* — Thomas C Diaz
(74) *Attorney, Agent, or Firm* — Amin, Turocy & Watson, LLP

(57) ABSTRACT

A knuckle guard of the embodiment includes a guard member disposed in front of a grip of a handle of a vehicle, a connecting member connected to the guard member, and a detachment structure provided in an attachment part between the guard member and the connecting member and configured to detach the guard member forward from the connecting member when a load exceeding a set value is applied to the guard member from behind, in which the detachment structure is provided in an inner portion in a vehicle width direction of the guard member.

4 Claims, 24 Drawing Sheets

KNUCKLE GUARD

CROSS-REFERENCE TO RELATED APPLICATION

Priority is claimed on Japanese Patent Application No. 2019-015489, filed Jan. 31, 2019, the content of which is incorporated herein by reference.

BACKGROUND

Field of the Invention

The present invention relates to a knuckle guard.

Description of Related Art

For example, Japanese Unexamined Patent Application, First Publication No. H10-297568 discloses an invention related to a knuckle guard of a bar handle vehicle such as a motorcycle. In Japanese Unexamined Patent Application, First Publication No. H10-297568, one of attachment portions of an inner end and an outer end of the knuckle guard is attached with a break pin, and the other thereof is fastened with a bolt.

SUMMARY

However, when a knuckle guard receives a load greater than or equal to a predetermined load, a break pin breaks and bends, and an attachment portion of the knuckle guard on a side to which the break pin is attached is opened. In this case, although a load from the front of a vehicle is taken into consideration, a load from behind is not taken into consideration, and further improvement is desired.

The present invention is to provide a knuckle guard that can better protect a rider's knuckle region.

SUMMARY OF THE INVENTION

A knuckle guard according to the present invention employs the following configuration.

(1) A knuckle guard according to the present invention including: a guard member disposed in front of a grip of a handle of a straddle-type vehicle, a connecting member connected to the guard member, and a detachment structure provided in an attachment part between the guard member) and the connecting member and configured to detach the guard member forward from the connecting member when a load exceeding a set value is applied to the guard member from behind, in which the detachment structure is provided in an inner portion in a vehicle width direction of the guard member.

(2) In the above mentioned aspect of (1), the detachment structure may include an elastic protruding part which protrudes rearward from the guard member and is elastically deformable, a protruding part holding hole provided in the connecting member for attachment of the elastic protruding part, and a protruding part detaching hole continuous with the protruding part holding hole for detachment of the elastic protruding part, and the protruding part holding hole may be provided on a rearward side of the protruding part detaching hole.

(3) In the above mentioned aspect of (2), the connecting member may include an attachment surface inclined inward in the vehicle width direction and rearward with respect to the front of the vehicle when viewed from above, the protruding part holding hole and the protruding part detaching hole may be provided on the attachment surface, and the elastic protruding part may be held by the protruding part holding hole from the front of the attachment surface.

(4) In the aspect of above mentioned (2) or (3), the protruding part holding hole and the protruding part detaching hole may have a continuous shape, the protruding part detaching hole may be larger than the protruding part holding hole, and the protruding part holding hole may be continuous with the protruding part detaching hole via a narrow-constricted part which is smaller than the protruding part holding hole.

(5) In the aspect of any one of above mentioned (2) to (4), the detachment structure may further include a fastening member which fastens together the guard member and the connecting member by elastically deforming the elastic protruding part.

According to the above mentioned aspect of (1), when the detachment structure is provided in the inner portion in the vehicle width direction of the guard member, since the guard member is not easily detached from the connecting member by a load from the front and lateral sides of the vehicle, it is possible to withstand impacts from the front and lateral sides of the vehicle. In addition, since the guard member is detached forward from the connecting member when a load exceeding an installation value is applied to the guard member from behind, a rider's body is not easily restricted by the grip and the knuckle guard. Accordingly, a rider's knuckle region can be better protected.

According to the above mentioned aspect of (2), the detachment structure includes the elastic protruding part which protrudes rearward from the guard member and is elastically deformable, the protruding part holding hole provided in the connecting member for attachment of the elastic protruding part, and the protruding part detaching hole continuous with the protruding part holding hole for detachment of the elastic protruding part, in which the protruding part holding hole achieves the following effects by being provided on a rearward side of the protruding part detaching hole. When the guard member and the connecting member are attached with a certain fastening force and a load exceeding an installation value is applied to the guard member from behind, the elastic protruding part moves from the protruding part holding hole to the protruding part detaching hole, and the guard member is detached from the connecting member. Therefore, a possibility of parts being damaged is low, and reassembly of the parts is possible.

According to the above mentioned aspect of (3), the connecting member includes the attachment surface inclined inward in the vehicle width direction and rearward with respect to a front of the vehicle when viewed from above, the protruding part holding hole and the protruding part detaching hole are provided on the attachment surface, the elastic protruding part is held by the protruding part holding hole from a front of the attachment surface, and thereby the following effects are achieved. When a load exceeding the installation value is applied to the guard member from behind, the load from behind changes in a direction in which the guard member is detached and comes out due to the inclination of the attachment surface, and thereby the guard member is detached. In addition, a load with which the guard member is detached can be set by adjusting an inclination angle of the attachment surface.

According to the above mentioned aspect of (4), the protruding part holding hole and the protruding part detaching hole have a continuous shape, the protruding part detaching hole is larger than the protruding part holding hole, the protruding part holding hole is continuous with the protruding part detaching hole via the narrow-constricted part that is smaller than the protruding part holding hole, and thereby the following effects are achieved. A removal load of the guard member can be set by setting a width of the narrow-constricted part.

According to the above mentioned aspect of (5), the detachment structure further includes a fastening member which fastens together the guard member and the connecting member by elastically deforming the elastic protruding part, and thereby the following effects are achieved. The guard member and the connecting member can be fastened by elastic deformation of the elastic protruding part, and the guard member can be detached from the connecting member when a load is applied in a constant direction. Therefore, a set load (a removal load of the guard member) can be adjusted.

DETAILED DESCRIPTION OF THE INVENTION

Figure 1:
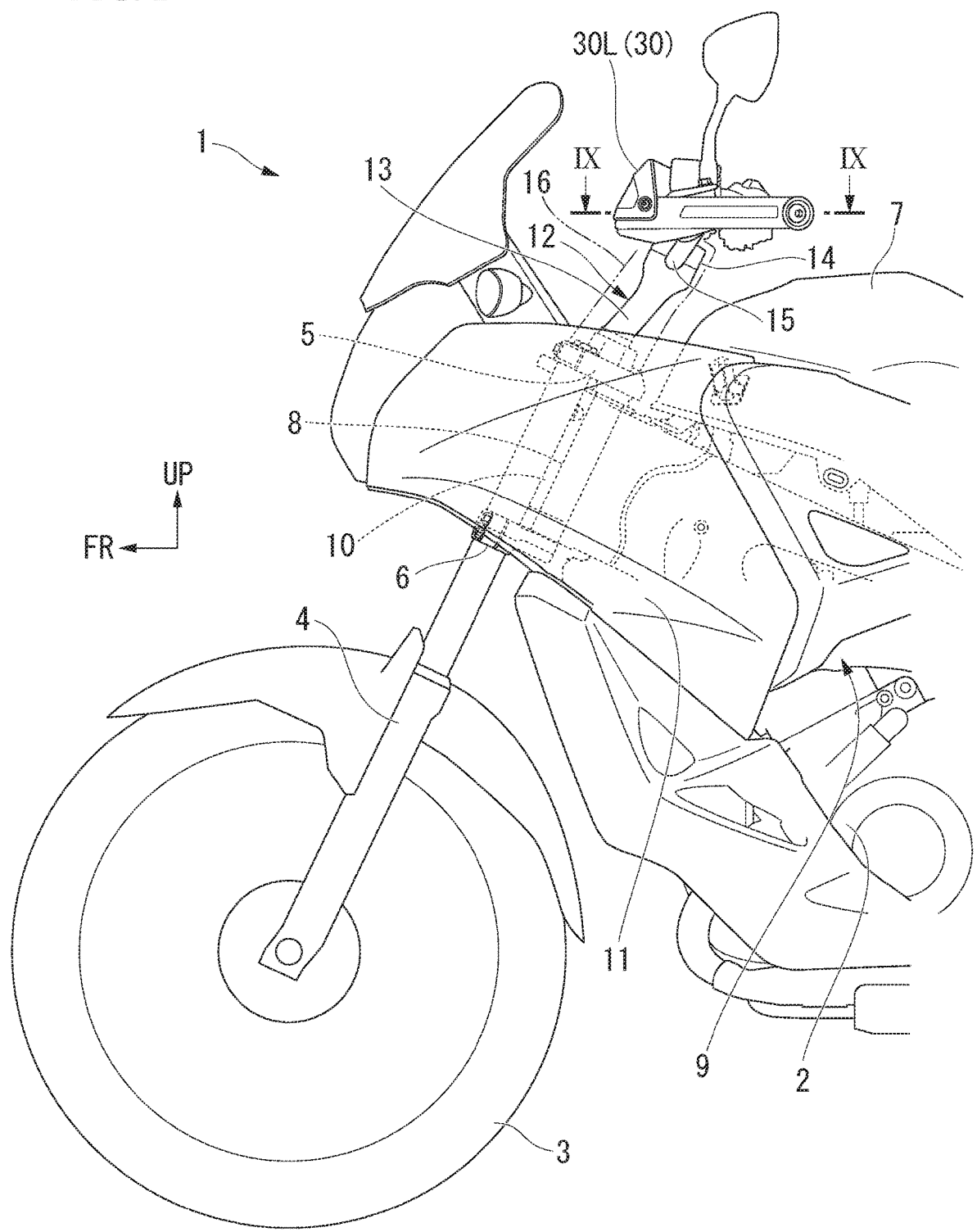
FIG. 1 is a left side view of a front portion of a motorcycle according to an embodiment.

An embodiment of the present invention will be described below with reference to the drawings. In the following description, directions such as forward, rearward, left, and right are the same as directions in a vehicle to be described below unless otherwise specified. An arrow FR indicating a forward direction with respect to the vehicle, an arrow LH indicating a leftward direction with respect to the vehicle, and an arrow UP indicating an upward direction with respect to the vehicle are shown at suitable positions in the drawings used for the following description.

<Overall Vehicle>

FIG. 1 shows a motorcycle 1 as an example of a straddle-type vehicle. Referring to FIG. 1, the motorcycle 1 includes an engine 2 mounted substantially at a center in a front-rear direction of a vehicle body. Hereinafter, the motorcycle may be simply referred to as a "vehicle" in some cases.

The motorcycle 1 includes a front wheel 3 disposed in front of the engine 2. The front wheel 3 is rotatably supported by a pair of left and right front forks 4. A top bridge 5 and a bottom bridge 6 are installed above the front fork 4 in order from the top. A fuel tank 7 is provided above the engine 2. A steering shaft 8 is vertically installed in an axial direction between the top bridge 5 and the bottom bridge 6. The steering shaft 8 is rotatably supported by a head pipe 10 provided at a front end of a vehicle body frame 9. A periphery of the head pipe 10 is covered with a front cowl 11.

A handle holder 12 is provided on an upper surface of the top bridge 5. The handle holder 12 includes a lower holder 13 fixed to the upper surface of the top bridge 5 and an upper holder 14 attached to an upper portion of the lower holder 13. A handle 15 is fixed to the handle holder 12 to be sandwiched between the lower holder 13 and the upper holder 14. For example, the handle 15 may be made of a metal pipe body. The handle 15 is a bar handle having a longitudinal direction in a vehicle width direction. Reference 16 in the drawing denotes a handle cover that covers a periphery of the handle holder 12.

Figure 2:
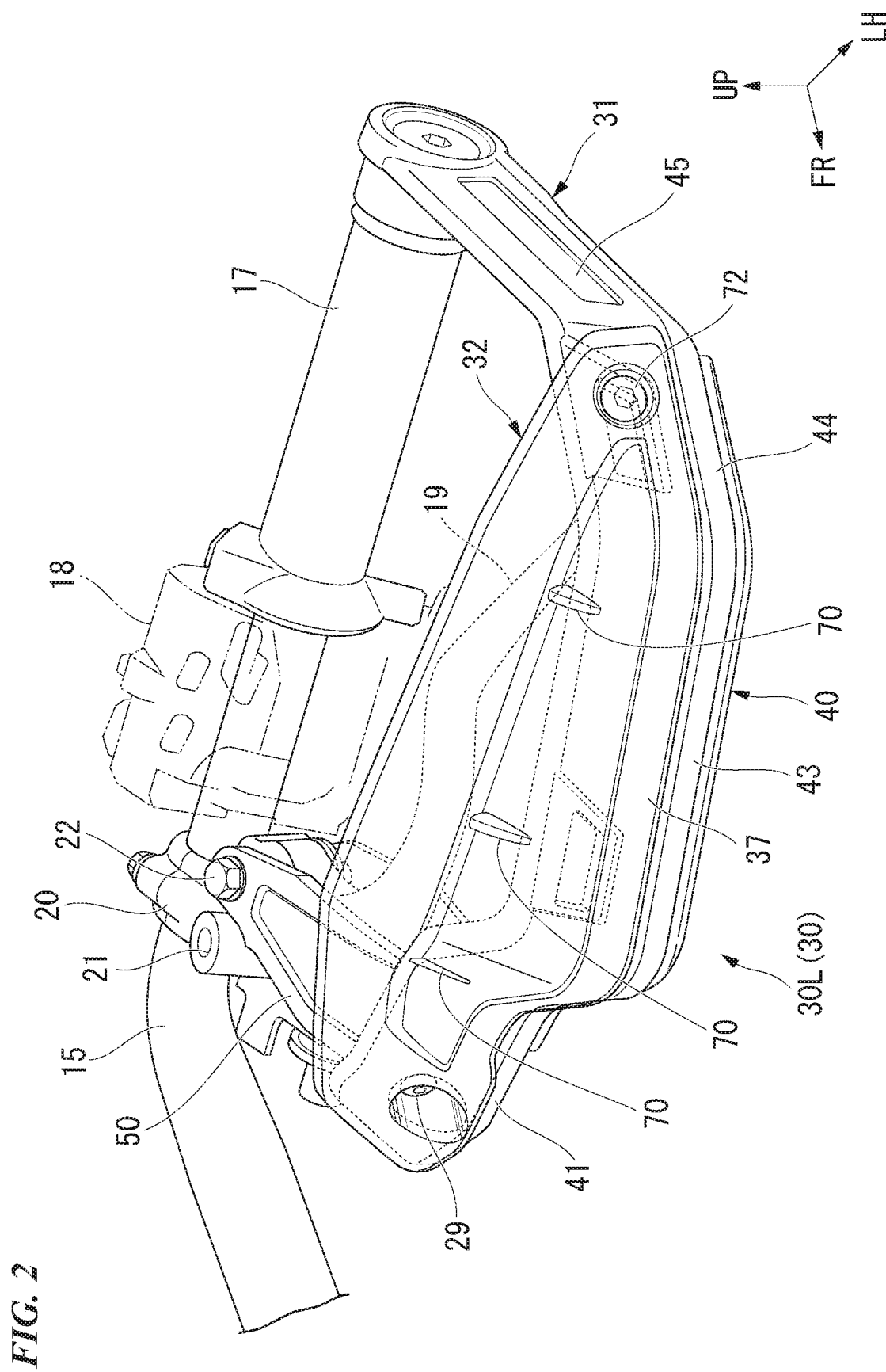
FIG. 2 is a perspective view of a left knuckle guard according to the embodiment from a front upper side.

As shown in FIG. 2, a cylindrical grip 17 made of a resin material is inserted and attached to an outer side of the handle 15 at an outer portion (a left portion in the drawing) in the vehicle width direction of the handle 15. A switch housing 18 (two-dot dashed line) in which switches of various types are housed is attached adjacent to the grip 17 on an inner side in the vehicle width direction of the grip 17 in the handle 15.

Figure 3:
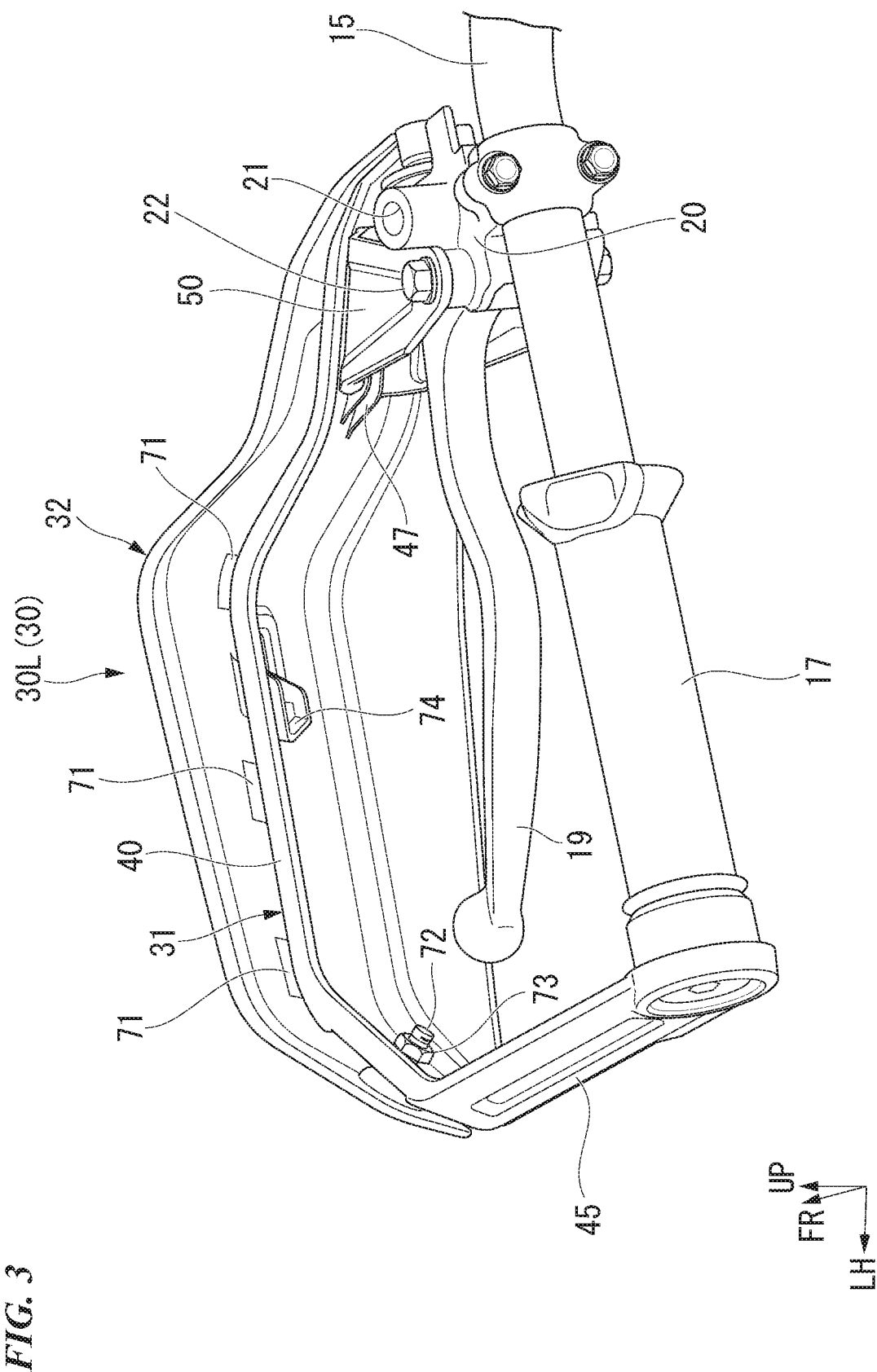
FIG. 3 is a perspective view of the left knuckle guard according to the embodiment from a rear upper side.

As shown in FIG. 3, a lever holder 20 that supports a clutch lever 19 to be rockable is provided on an inner side in the vehicle width direction of the switch housing 18 (see FIG. 2) in the handle 15. In FIG. 3, illustrations of the switch housing 18 will be omitted. Reference 21 in the drawing denotes a side mirror attachment part. A brake lever 121 is supported to be rockable at a right portion of the handle 15 (see FIG. 18).

In the present embodiment, a knuckle guard 30 is provided at each of the left and right portions of the handle 15. Hereinafter, the knuckle guard provided at the left portion of the handle 15 may be referred to as a "left knuckle guard," the knuckle guard provided at the right portion of the handle 15 may be referred to as a "right knuckle guard," and the left and right knuckle guards may be collectively referred to as a "knuckle guard" in some cases.

<Left Knuckle Guard>

Figure 5:
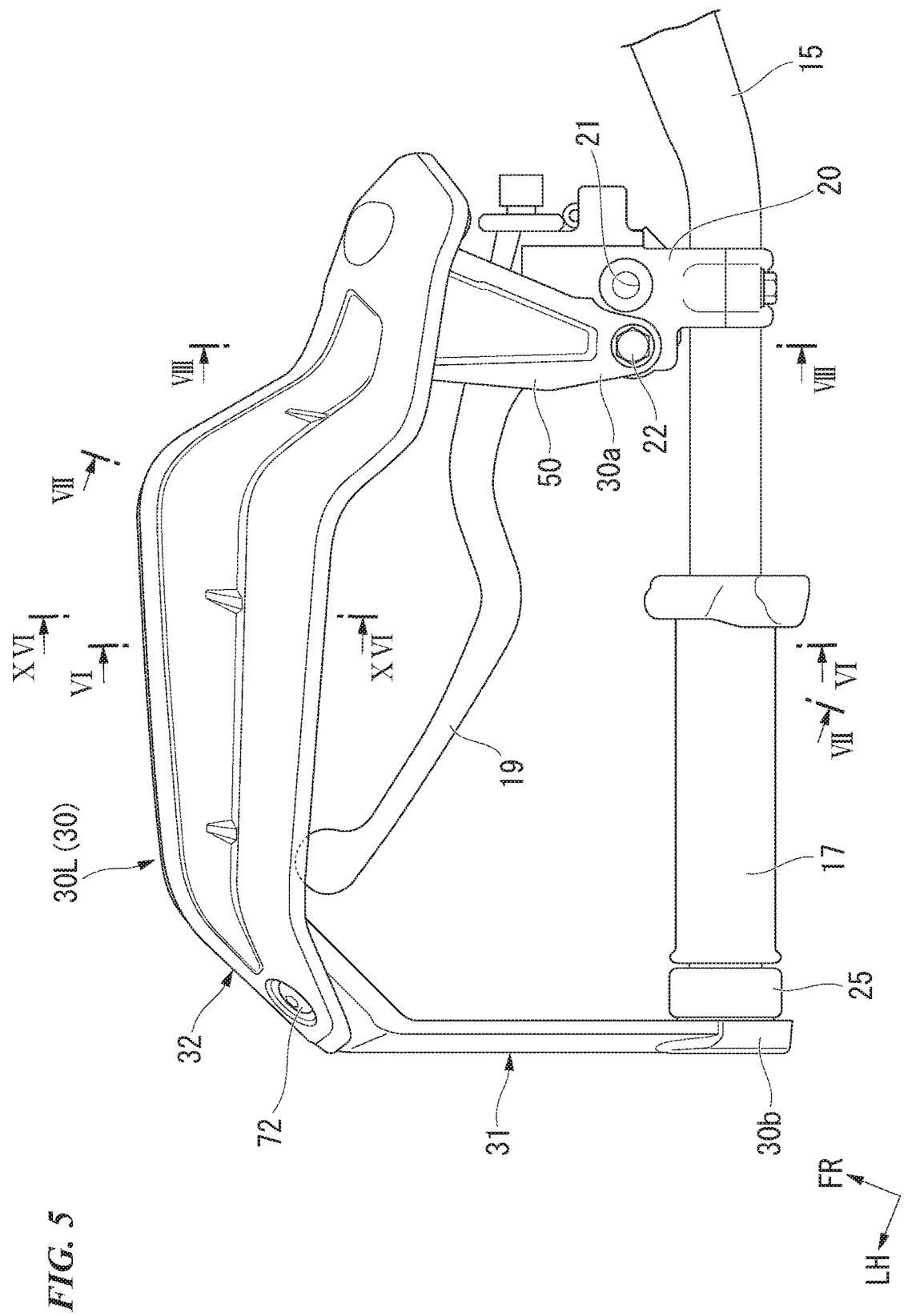
FIG. 5 is a top view of the left knuckle guard according to the embodiment.

As shown in FIG. 5, the left knuckle guard 30L (hereinafter, also simply referred to as a "knuckle guard 30") is disposed in front of the grip 17 to straddle the grip 17 and the handle 15. For example, the knuckle guard 30 may be made of a resin. The knuckle guard 30 covers the front of a hand of a rider when the rider grips the grip 17. The knuckle guard 30 has a U shape that opens rearward when viewed from above.

The lever holder 20 also serves as a fastening holder that fixes an inner end part 30a of the knuckle guard 30. The inner end part 30a of the knuckle guard 30 is fastened by a bolt 22, a collar 23, and the like that constitute a rocking shaft of the clutch lever 19 (see FIG. 8).

Figure 9:
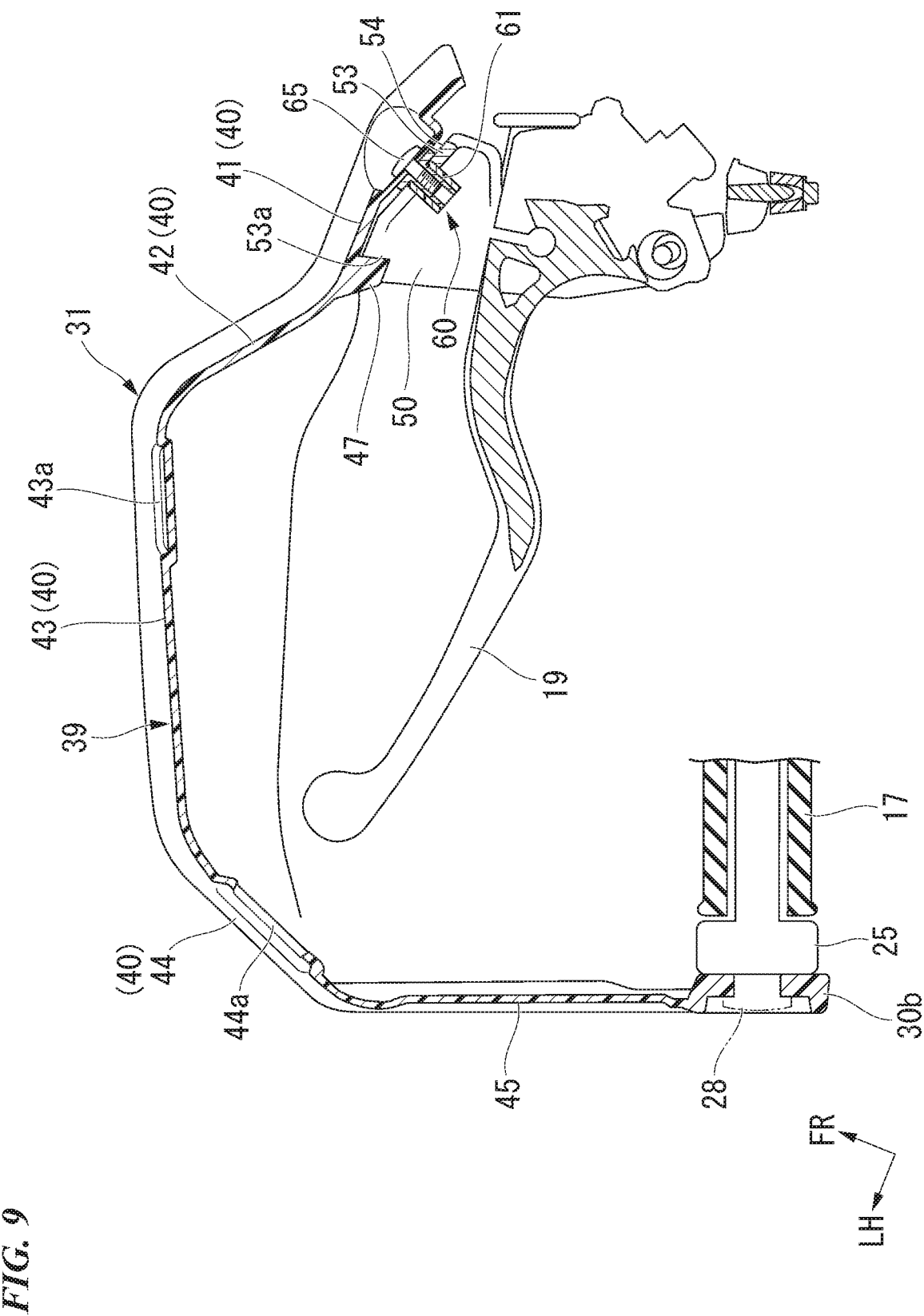
FIG. 9 is a view including a cross section along line IX-IX of FIG. 1.

The knuckle guard 30 extends outward in the vehicle width direction and straddles the grip 17 in the vehicle width direction with its inner end part 30a fixed to the lever holder 20. Reference 25 in the drawing denotes a weight that protrudes outward in the vehicle width direction from the grip 17. The weight 25 has a function of suppressing vibrations of the handle 15. In FIG. 9, reference 28 denotes a bolt for fixing an outer end part 30b of the knuckle guard 30.

Figure 7:
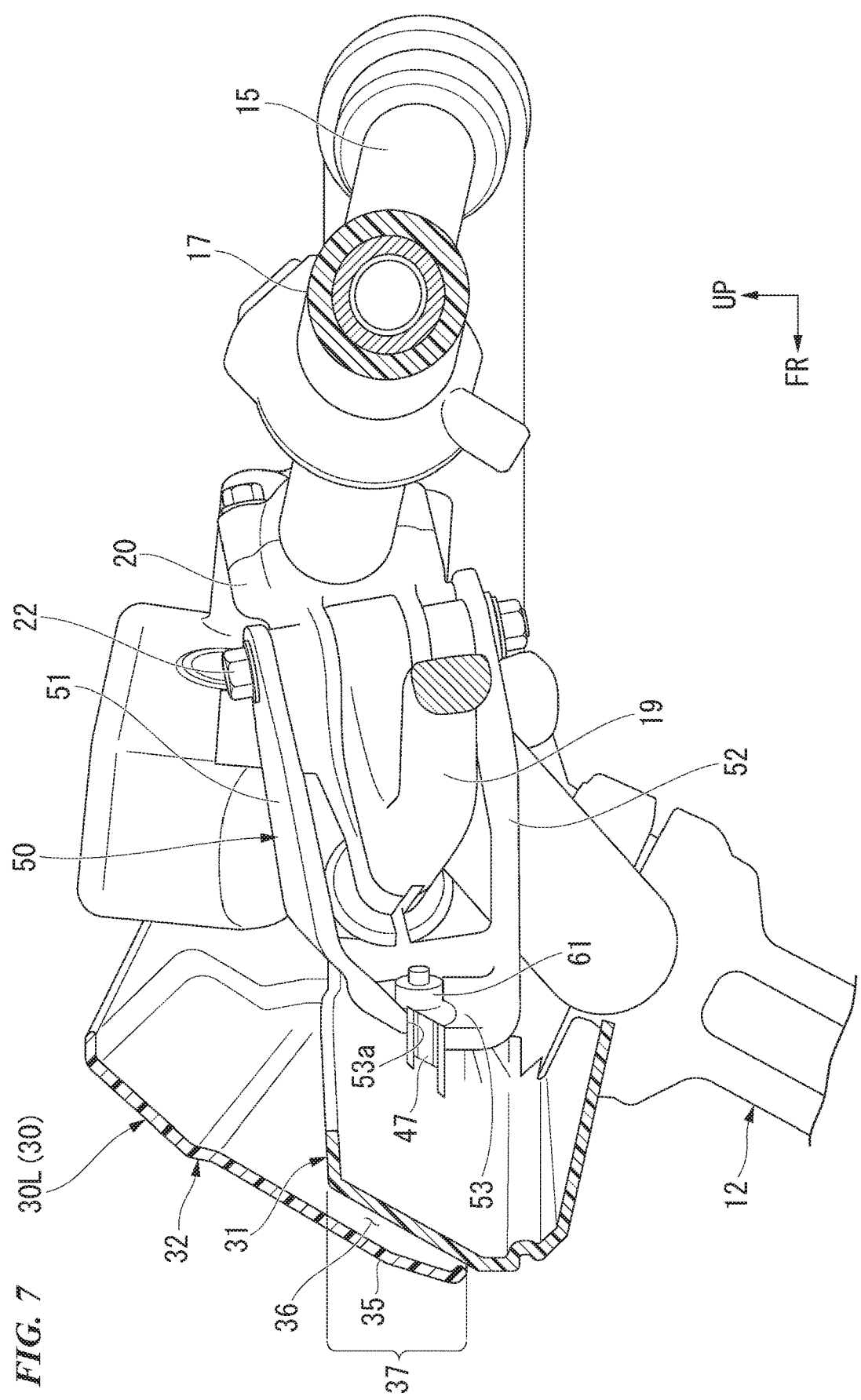
FIG. 7 is a view including a cross section along line VII-VII of FIG. 5.

As shown in FIG. 7, the knuckle guard 30 includes an airflow guide part 35 disposed in front of the grip 17. The airflow guide part 35 includes a communication hole 36 that opens in a vertical direction. The airflow guide part 35 covers the communication hole 36 so that the communication hole 36 is not seen in a front view.

The knuckle guard 30 has a divided structure. The knuckle guard 30 includes a first protective member 31 disposed in front of the grip 17 and a second protective member 32 disposed in front of the first protective member 31.

<First Protective Member>

Figure 4:
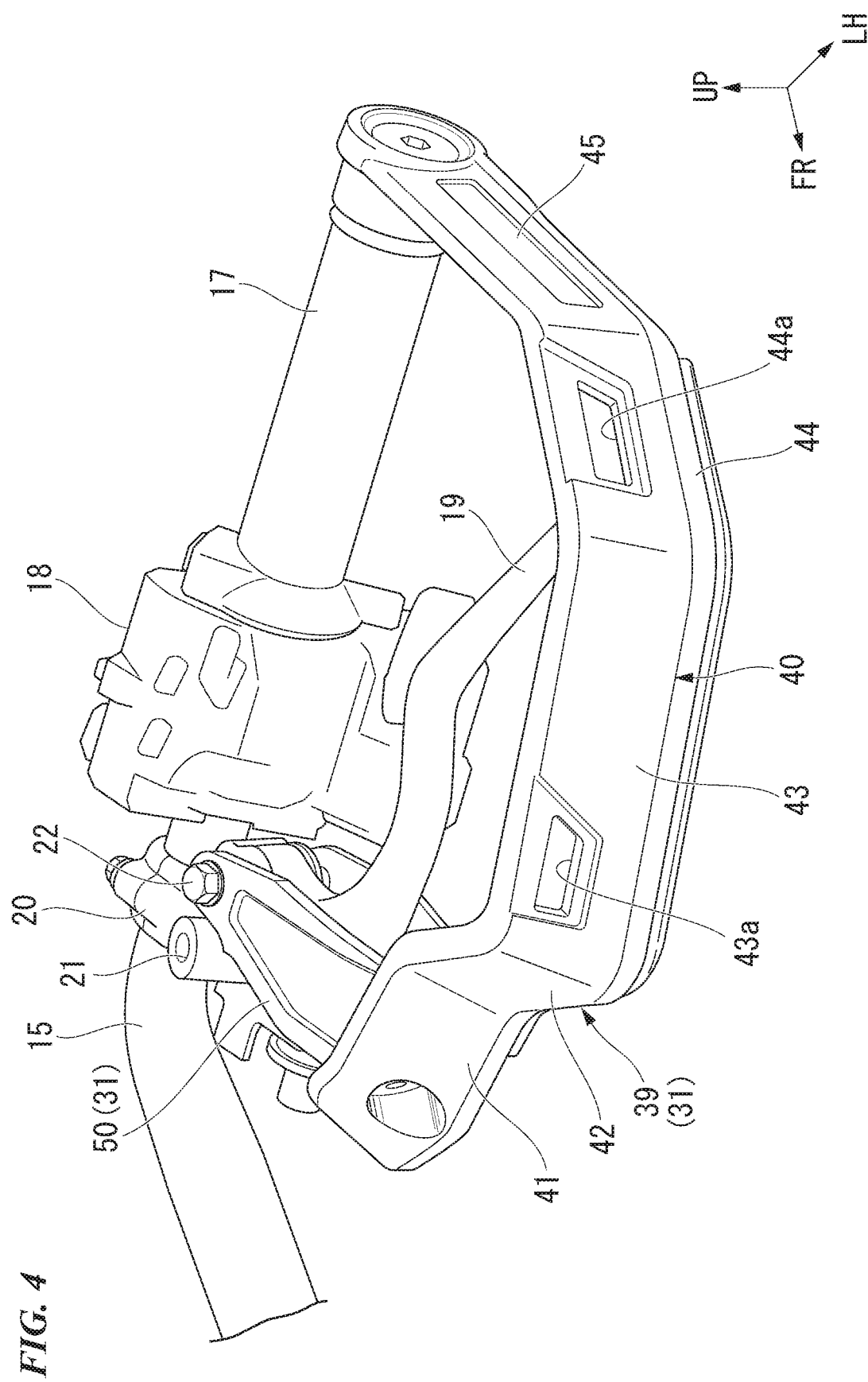
FIG. 4 is a perspective view of a first protective member of the left knuckle guard according to the embodiment from a front upper side.

The first protective member 31 has a U shape that opens rearward when viewed from above (see FIG. 9). As shown in FIG. 4, the first protective member 31 includes a guard member 39 disposed in front of the grip 17 and a connecting member 50 that connects the guard member 39 and the lever holder 20.

The guard member 39 has an L shape when viewed from above to protect a front surface and a side surface of rider's knuckle region (see FIG. 9). The guard member 39 includes a front protective part 40 positioned in front of the grip 17 and a lateral side protective part 45 positioned on a lateral side of the grip 17. The front protective part 40 and the lateral side protective part 45 are integrally formed of the same member.

Figure 6:
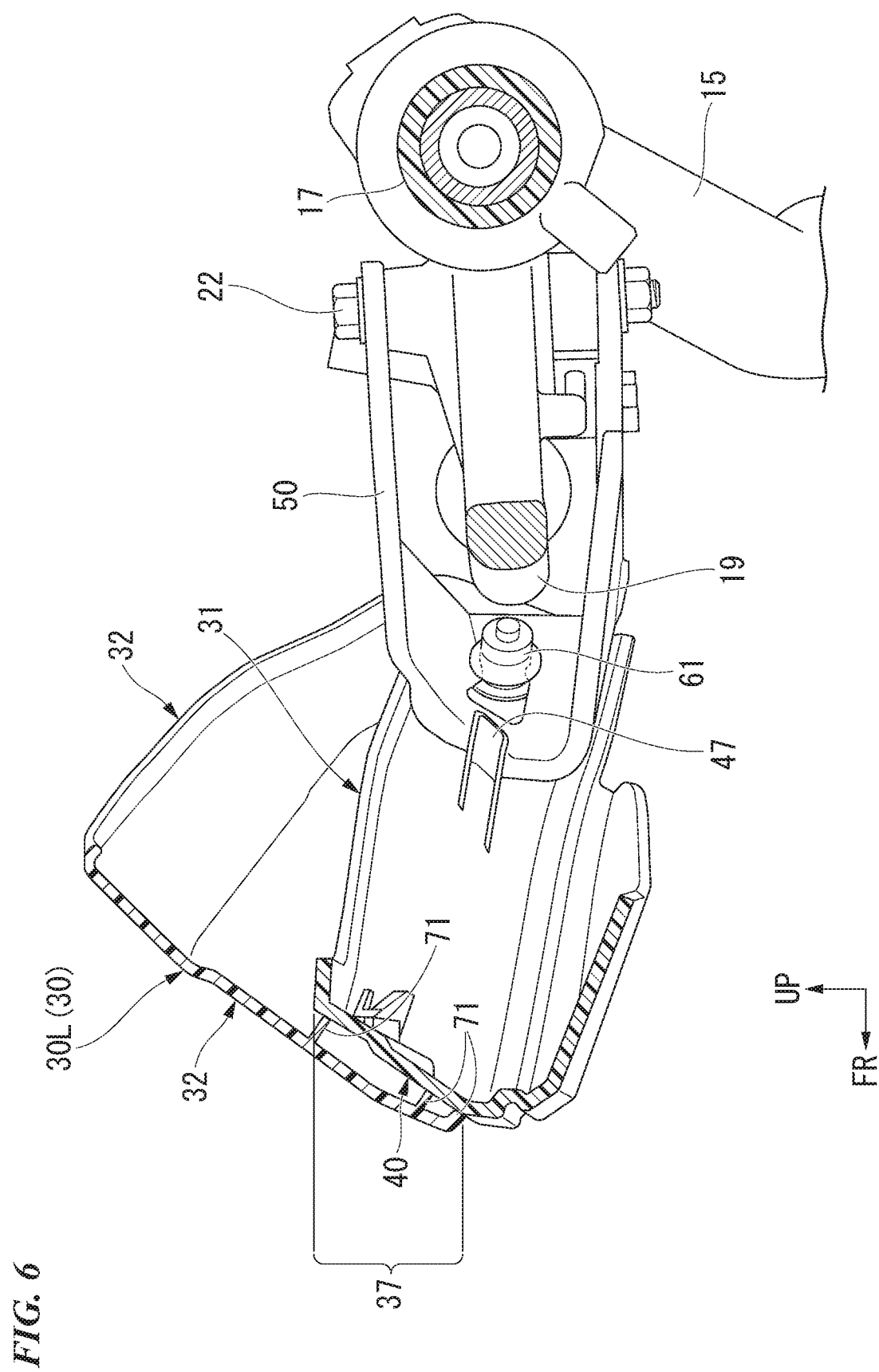
FIG. 6 is a view including a cross section along line VI-VI of FIG. 5.

In a cross-sectional view, the front protective part 40 has a U shape that opens rearward (see FIG. 6). As shown in FIG. 9, the front protective part 40 includes a first extended part 41, a second extended part 42, a third extended part 43, and a fourth extended part 44.

When viewed from above, the first extended part 41 includes an inner end in the vehicle width direction of the first extended part 41 positioned on a rearward side and an outer end in the vehicle width direction of the first extended part 41 inclined to be positioned on a forward side. The first extended part 41 is attached to the connecting member 50 to be detachable from the connecting member 50 (see FIG. 9).

An engaging protrusion part 47 that is engageable with a recessed part 53a of a front wall part 53 of the connecting member 50 is provided at an outer portion (a portion adjacent to the second extended part 42) in the vehicle width direction of the first extended part 41 (see FIG. 9). The engaging protrusion part 47 protrudes rearward from a rear surface of the outer portion in the vehicle width direction of the first extended part 41 (see FIG. 7).

When viewed from above, the second extended part 42 extends obliquely forward and outward from the outer end in the vehicle width direction of the first extended part 41. The second extended part 42 connects the first extended part 41 and the third extended part 43.

When viewed from above, the third extended part 43 extends outward in the vehicle width direction from the front end of the second extended part 42. The third extended part 43 includes a claw insertion hole 43a through which an engaging claw 74 (see FIG. 22) of the second protective member 32 is inserted. The claw insertion hole 43a has a rectangular shape having a longitudinal dimension in the vehicle width direction (specifically, in a direction in which the third extended part 43 extends) (see FIG. 4). The claw insertion hole 43a is disposed on an upper portion of an inner portion in the vehicle width direction of the third extended part 43 (see FIG. 4).

When viewed from above, the fourth extended part 44 extends obliquely rearward and outward from an outer end in the vehicle width direction of the third extended part 43. The fourth extended part 44 includes an attachment hole 44a for attachment of the second protective member 32 (see FIG. 22). The attachment hole 44a has a rectangular shape having a longitudinal dimension in the vehicle width direction (specifically, in a direction in which the fourth extended part 44 extends) (see FIG. 4). The attachment hole 44a is disposed on an upper portion of the fourth extended part 44 (see FIG. 4).

When viewed from above, the lateral side protective part 45 extends rearward from an outer end in the vehicle width direction of the fourth extended part 44. A rear end portion of the lateral side protective part 45 is fixed to an outer end portion (a fixing rubber member 26) in the vehicle width direction of the handle 15.

Figure 14:
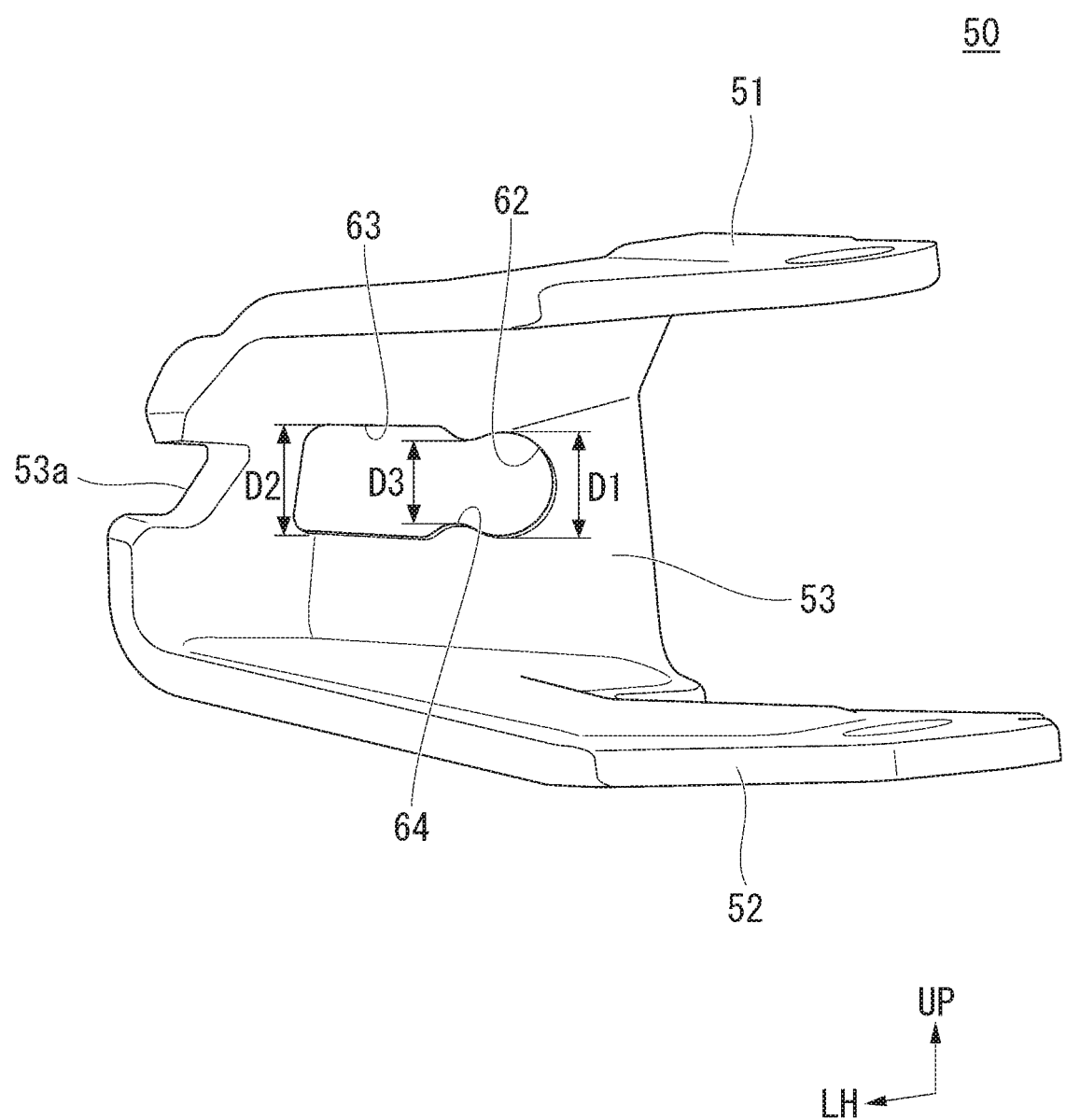
FIG. 14 is a rear view of the connecting member of the left knuckle guard according to the embodiment.

When viewed from above, an outer shape of the connecting member 50 has a U shape protruding rearward (see FIG. 5). In a cross-sectional view, the connecting member 50 has a U shape that opens rearward (see FIG. 8). The connecting member 50 protects a pivot part of the clutch lever 19. As shown in FIG. 14, the connecting member 50 includes an upper wall part 51, a lower wall part 52, and the front wall part 53. The upper wall part 51, the lower wall part 52, and the front wall part 53 are integrally formed of the same member.

Figure 8:
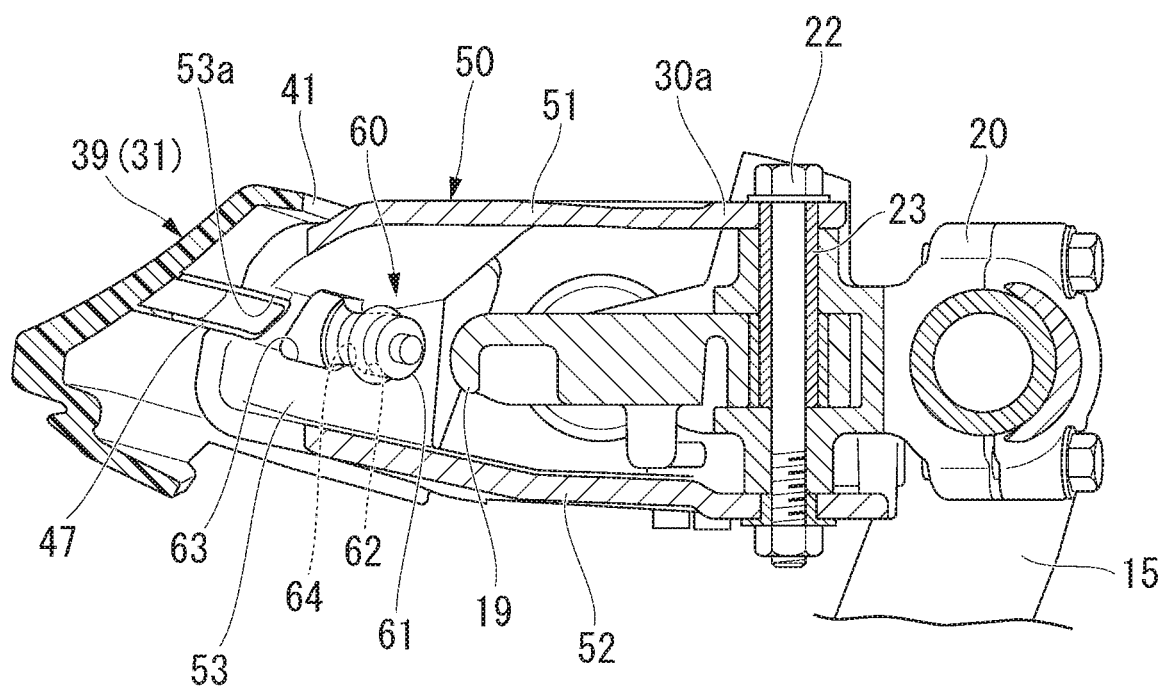
FIG. 8 is a view including a cross section along line VIII-VIII of FIG. 5.
Figure 8:
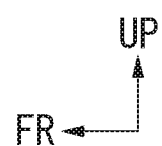
Figure 12:
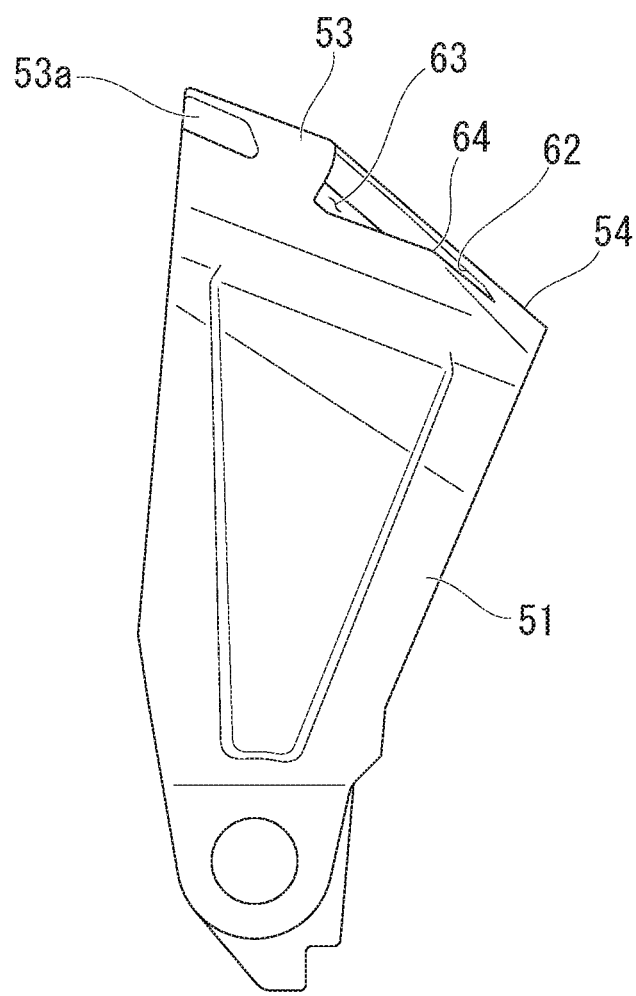
FIG. 12 is a top view of a connecting member of the left knuckle guard according to the embodiment.

As shown in FIG. 8, the upper wall part 51 is disposed on an upper side of the clutch lever 19. The upper wall part 51 has a plate shape extending in a front-rear direction. When viewed from above, the upper wall part 51 has an outer shape in which a left-right width becomes smaller toward the rear side (see FIG. 12).

The lower wall part 52 is disposed on a lower side of the clutch lever 19. The lower wall part 52 has a plate shape extending in a front-rear direction. In the front-rear direction, the lower wall part 52 is longer than the upper wall part 51 (see FIG. 13).

The front wall part 53 is disposed on a front side of the clutch lever 19. The front wall part 53 connects a front end of the upper wall part 51 and a front end of the lower wall part 52. When viewed from above, the front wall part 53 is inclined to follow the first extended part 41 of the front protective part 40 such that an inner end in the vehicle width direction of the front wall part 53 is positioned on a rearward side and an outer end in the vehicle width direction of the front wall part 53 is positioned on a forward side (see FIG. 9). The front wall part 53 has an attachment surface 54 (see FIG. 12) that is inclined inward in the vehicle width direction and rearward with respect to the front of the vehicle when viewed from above. A recessed part 53*a* that opens outward in the vehicle width direction is provided in the front wall part 53.

As shown in FIG. 9, a detachment structure 60 which detaches the guard member 39 forward from the connecting member 50 when a load exceeding a set value is applied to the guard member 39 from behind is provided in the attachment part between the guard member 39 and the connecting member 50. The detachment structure 60 is provided in an inner portion in the vehicle width direction of the guard member 39.

As shown in FIG. 8, the detachment structure 60 includes an elastic protruding part 61 which protrudes rearward from the guard member 39 and is elastically deformable, a protruding part holding hole 62 provided in the connecting member 50 for attachment of the elastic protruding part 61, a protruding part detaching hole 63 continuous with the protruding part holding hole 62 for detachment of the elastic protruding part 61, and a fastening member 65 (see FIG. 9) which fastens together the guard member 39 and the connecting member 50 by elastically deforming the elastic protruding part 61.

As shown in FIG. 9, the elastic protruding part 61 has a cylindrical shape that protrudes rearward from the first extended part 41 of the guard member 39. For example, the elastic protruding part 61 may be a blind nut made of a rubber. The elastic protruding part 61 is attached to the first extended part 41 using the fastening member 65 such as a bolt. The elastic protruding part 61 protrudes obliquely to the left and rearward from the first extended part 41.

Figure 13:
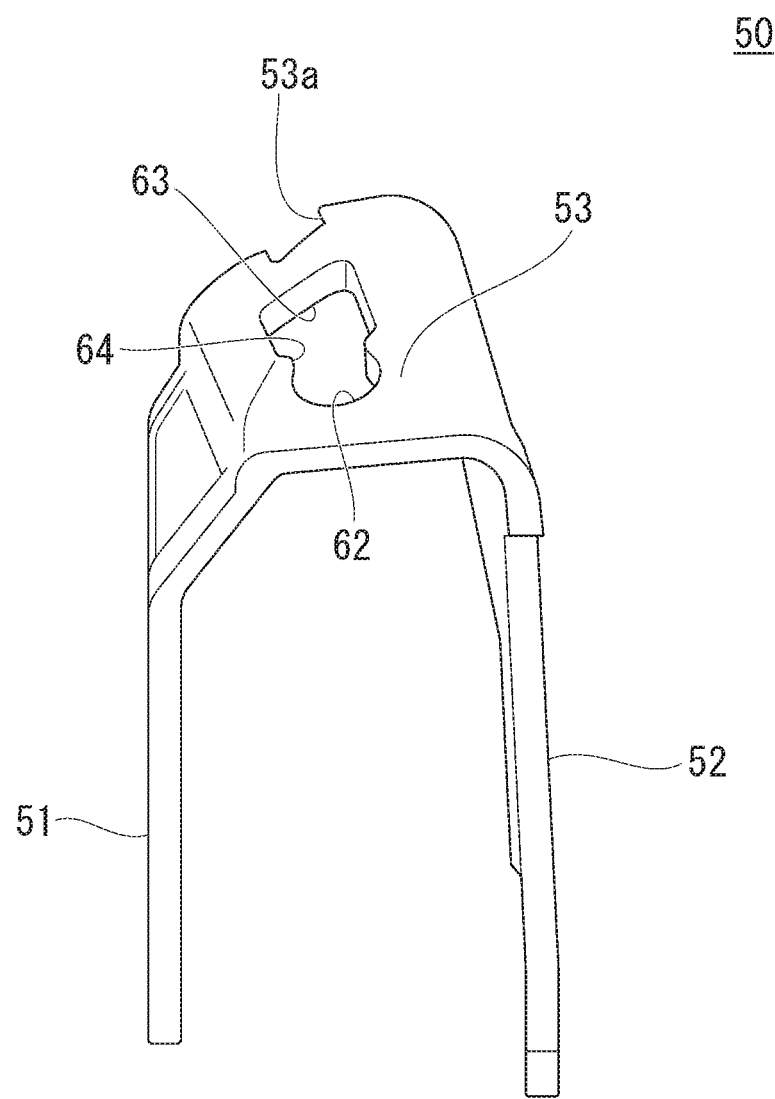
FIG. 13 is a right side view of the connecting member of the left knuckle guard according to the embodiment.
Figure 13:
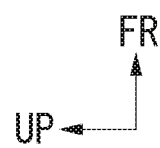

As shown in FIG. 13, the protruding part holding hole 62 and the protruding part detaching hole 63 are provided in the front wall part 53 (attachment surface 54) of the connecting member 50. The protruding part holding hole 62 and the protruding part detaching hole 63 are arranged in the vehicle width direction (specifically, a direction in which the front wall part 53 is inclined). The protruding part holding hole 62 is provided on a rearward side of the protruding part detaching hole 63.

As shown in FIG. 14, the protruding part holding hole 62 and the protruding part detaching hole 63 have a continuous shape.

The protruding part detaching hole 63 is larger than the protruding part holding hole 62. The protruding part holding hole 62 is continuous with the protruding part detaching hole 63 via a narrow-constricted part 64 that is smaller than the protruding part holding hole 62. In the drawing, reference D1 indicates a diameter of the protruding part holding hole 62, reference D2 indicates a vertical width of the protruding part detaching hole 63, and reference D3 indicates a vertical width of the narrow-constricted part 64. The vertical width D2 of the protruding part detaching hole 63 is larger than the diameter D1 of the protruding part holding hole 62 (D2>D1). The vertical width D3 of the narrow-constricted part 64 is smaller than the diameter D1 of the protruding part holding hole 62 (D3<D1).

Figure 24:
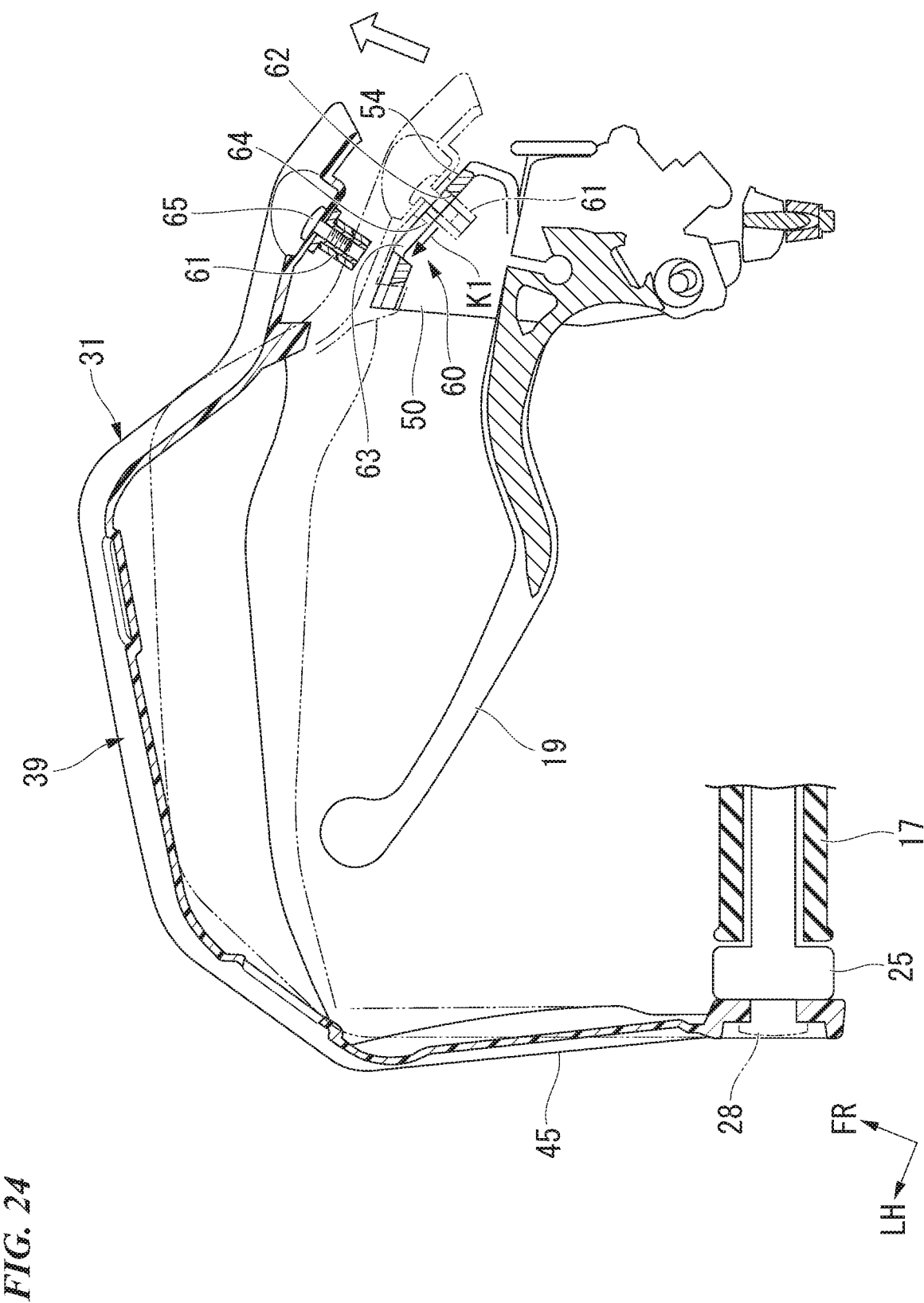
FIG. 24 is an explanatory view of an operation of the detachment structure according to the embodiment.

The narrow-constricted part 64 restricts outward movement of the elastic protruding part 61 in the vehicle width direction (see the elastic protruding part 61 indicated by a two-dot dashed line in FIG. 24) so that the elastic protruding part 61 is positioned in the protruding part holding hole 62 until a load exceeding a set value is applied to the guard member 39 from behind (that is, while a load equal to or less than the set value is applied thereto). The elastic protruding part 61 moves from the protruding part holding hole 62 toward the protruding part detaching hole 63 when a load exceeding the set value is applied to the guard member 39 from behind (see arrow K1 along the attachment surface 54 in FIG. 24).

Figure 11:
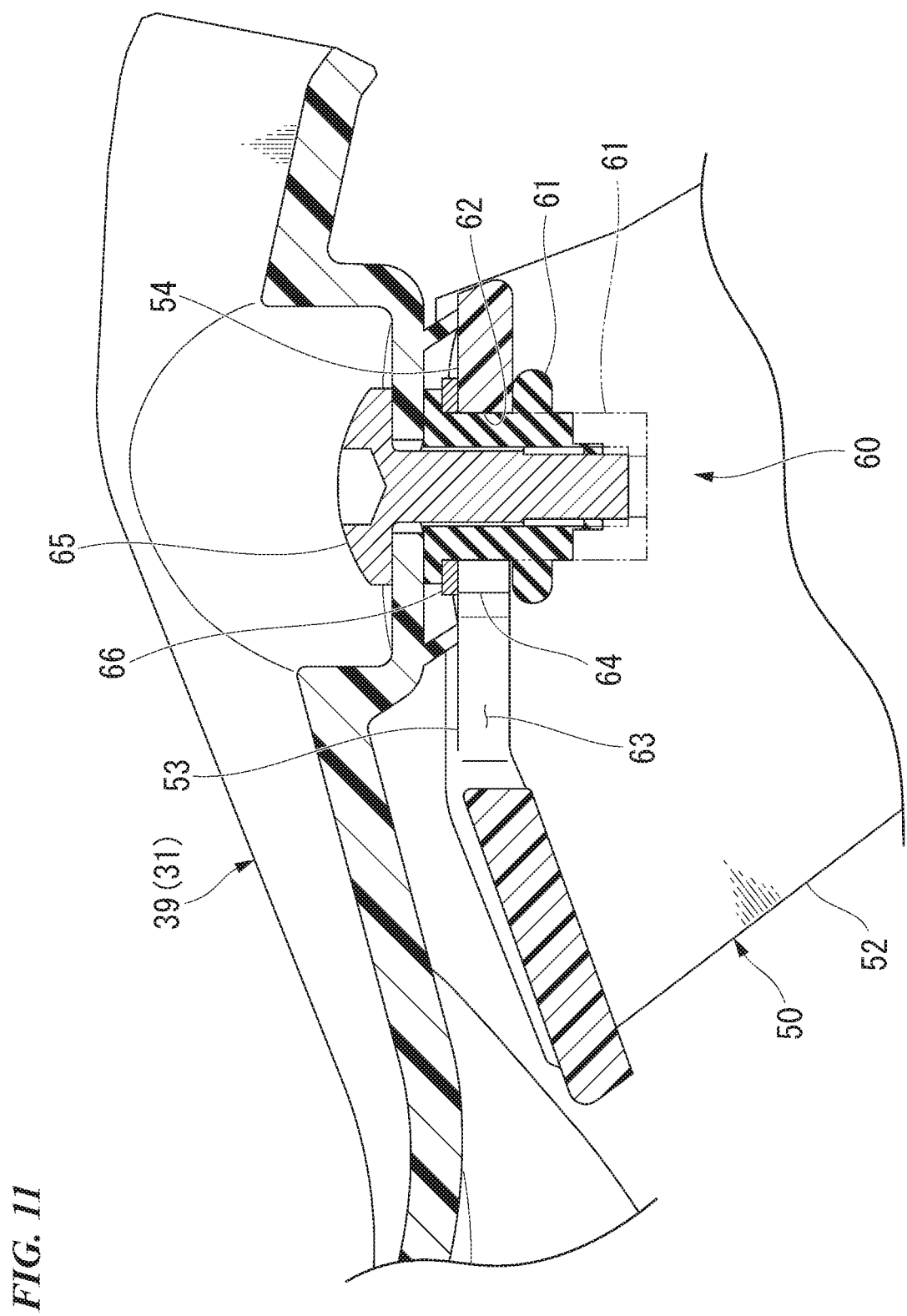
FIG. 11 is an enlarged view showing a main part of FIG. 9 including a cross section of a detachment structure of the left knuckle guard according to the embodiment.

As shown in FIG. 11, the elastic protruding part 61 is held by the protruding part holding hole 62 from the front of the attachment surface 54. The guard member 39 and the connecting member 50 can be fastened by elastically deforming the elastic protruding part 61, for example, by a bolt fastening operation from one side (vehicle front side). In the drawing, the elastic protruding part 61 before the elastic deformation is indicated by a two-dot dashed line, and the elastic protruding part 61 after the elastic deformation is indicated by a solid line.

Specifically, since a portion of the elastic protruding part 61 (a portion of a bolt on a shaft portion side) is bent by fastening up the bolt 65, the guard member 39 and the connecting member 50 can be fastened. With the elastic protruding part 61 interposed between the guard member 39 and the connecting member 50, effects of vibration absorption, insulation, and sealing can be obtained. Reference 66 in the drawing denotes a washer provided between the guard member 39 (a portion on a bolt head portion side of the elastic protruding part 61) and the connecting member 50.

Figure 10:
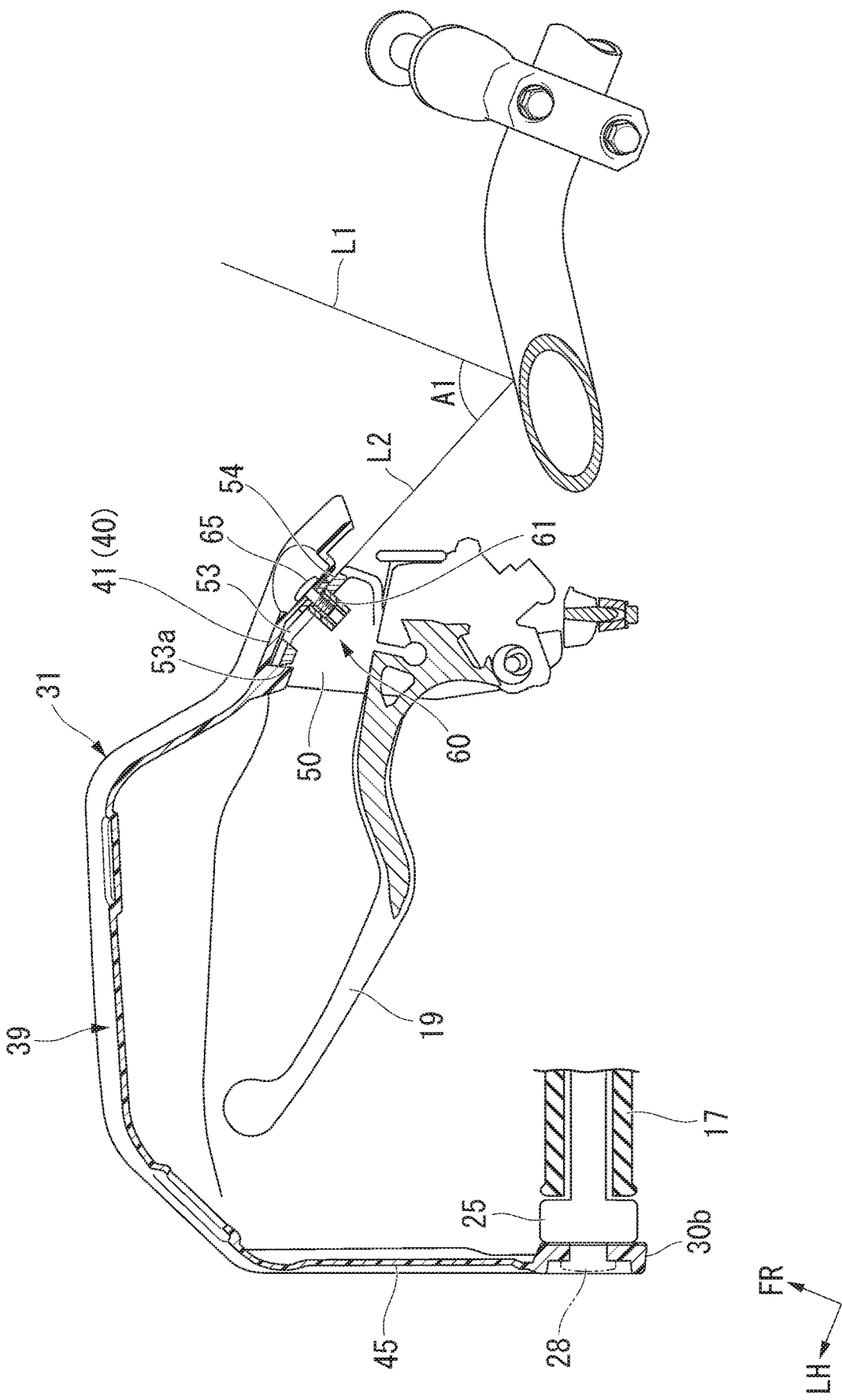
FIG. 10 is an explanatory view of disposition of the left knuckle guard according to the embodiment.

In FIG. 10, reference L1 indicates a virtual straight line extending in the front-rear direction, and reference L2 indicates a virtual extension line along the attachment surface 54 (a front surface of the front wall part 53). Here, the virtual straight line L1 is set on the assumption that a load is applied to the guard member 39 in the vehicle front-rear direction (corresponding to a load at the time of a collision). For example, an angle A1 formed by the virtual straight line L1 and the virtual extension line L2 (the attachment surface 54) may be 90 degrees or less (acute angle). Thereby, when a load exceeding a set value is applied to the guard member 39 from behind, the guard member 39 can be easily detached forward from the connecting member 50.

Further, although the angle A1 is not limited as long as it is in a range in which the detaching operation is possible, the angle A1 is set to about 70 degrees in the present embodiment.

<Second Protective Member>

As shown in FIG. 2, the second protective member 32 has a larger outer shape than the front protective part 40 of the first protective member 31. The second protective member 32 extends in the vehicle width direction along the front protective part 40. An upper end of the second protective member 32 is positioned above an upper end of the first protective member 31. An upper edge of the second protective member 32 has a curved shape which is convex upward. A lower end of the second protective member 32 is positioned above a lower end of the front protective part 40. A lower edge of the second protective member 32 has an outer shape along a front edge of the front protective part 40. In a cross-sectional view, a front surface of the second protective member 32 is inclined such that the upper end of the second protective member 32 is positioned on a rearward side and the lower end of the second protective member 32 is positioned on a forward side (see FIG. 6).

A plurality of (for example, three in the embodiment) ribs 70 are provided on the front surface of the second protective member 32. The ribs 70 extend in the inclination direction of the front surface of the second protective member 32. The three ribs 70 are disposed at intervals in the vehicle width direction (specifically, in a direction in which the second protective member 32 extends).

The second protective member 32 is attachable to and detachable from the first protective member 31.

An inner portion in the vehicle width direction of the second protective member 32 is attached to the first extended part 41 of the first protective member 31 using a fastening member 29 such as a bolt. The second protective member 32 is attached to the connecting member 50 together with the first protective member 31 to be detachable from the connecting member 50.

Figure 15:
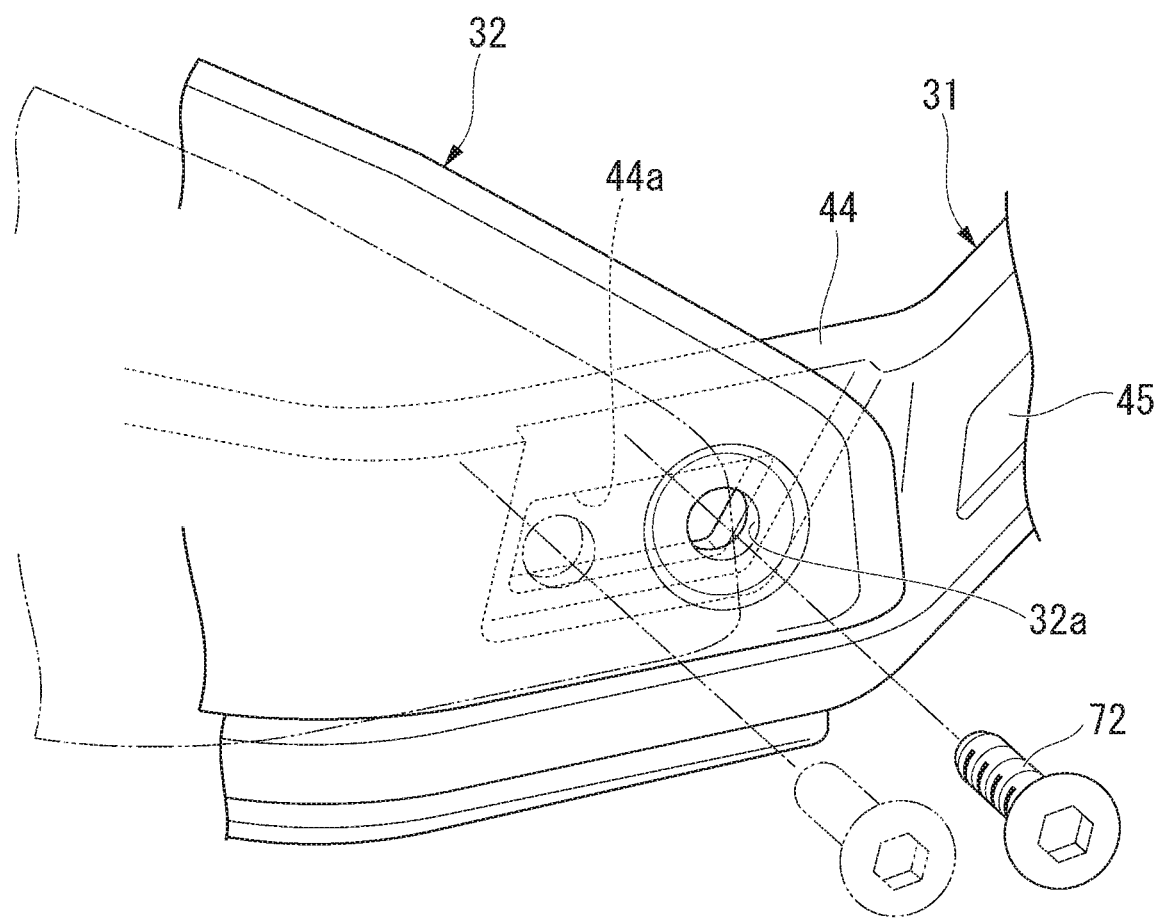
FIG. 15 is an explanatory view of an attachment structure between a first protective member and a second protective member according to the embodiment.

An outer end portion in the vehicle width direction of the second protective member 32 is attached to the fourth extended part 44 of the first protective member 31 using a fastening member 72 such as a bolt. A solid line in FIG. 15 shows an initial state before the second protective member 32 is bent. As shown in FIG. 15, a circular through hole 32a into which a shaft portion of the bolt 72 can be inserted is provided on an outer portion in the vehicle width direction of the second protective member 32. For example, the bolt 72 is inserted into the attachment hole 44a of the fourth extended part 44 through the through hole 32a of the second protective member 32, and then the bolt 72 is caused to protrude from a rear surface of the fourth extended part 44 (see FIG. 22). Then, the second protective member 32 can be fixed to the first protective member 31 by screwing a nut 73 on a protruding part (male thread part) of the bolt 72 (see FIG. 22).

Figure 22:
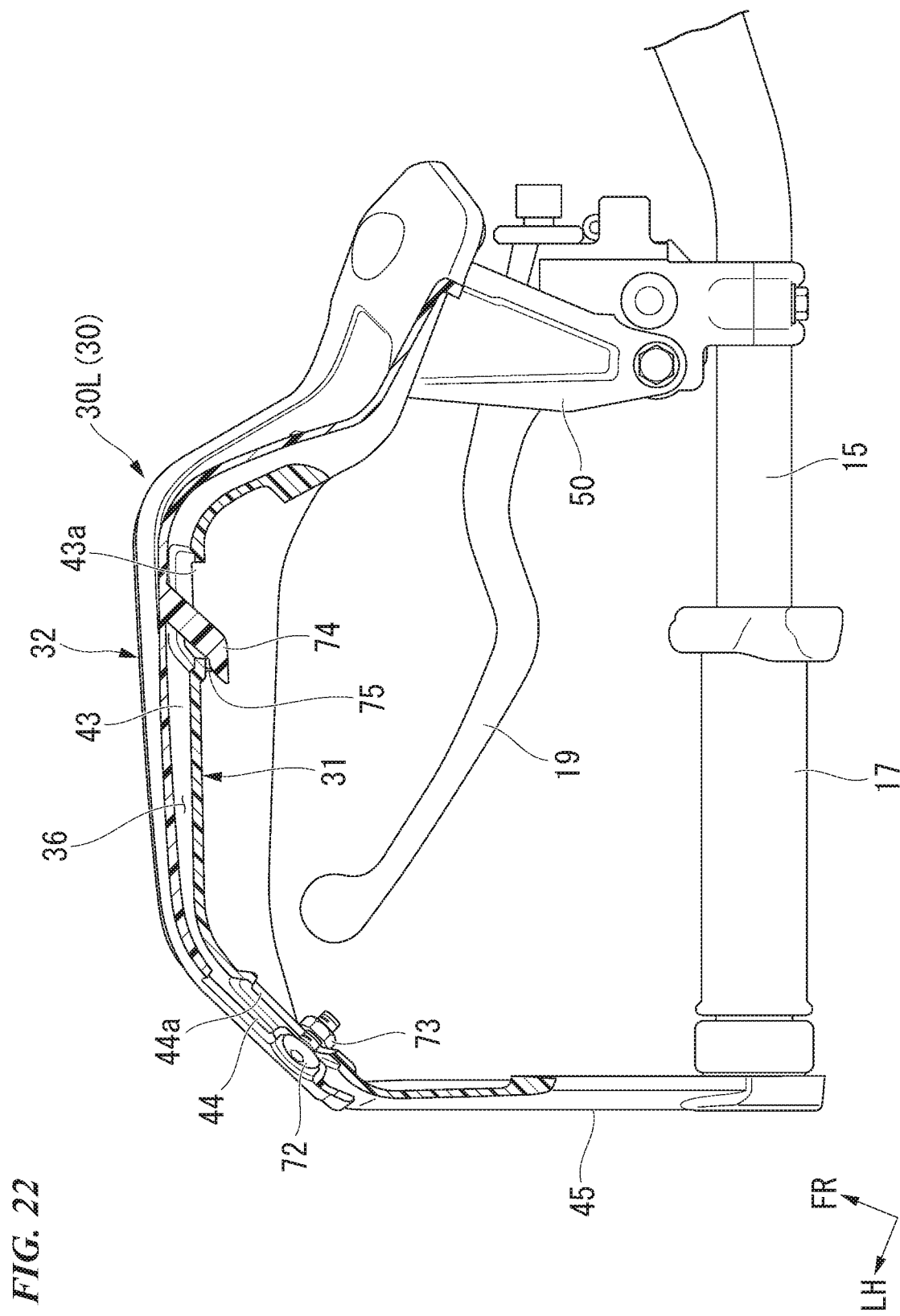
FIG. 22 is an explanatory view of an operation of the second protective member according to the embodiment.

As shown in FIG. 22, the engaging claw 74 that is inserted through the claw insertion hole 43a of the third extended part 43 of the first protective member 31 is provided at a center portion in the vehicle width direction of the second protective member 32. The engaging claw 74 functions as a positioning part that defines a relative position between the first protective member 31 and the second protective member 32 in the attachment hole 44a. The engaging claw 74 protrudes rearward from a rear surface of the central portion of the second protective member 32 in the vehicle width direction. The engaging claw 74 has an L shape extending obliquely to the left and rearward.

<Communication Hole>

As shown in FIG. 7, the first protective member 31 and the second protective member 32 form a layered part 37 in which the protective members overlap each other. The layered part 37 opens in the vertical direction due to the communication hole 36. The layered part 37 is a portion in which the front protective part 40 of the first protective member 31 and a lower portion of the second protective member 32 overlap in a front view (see FIG. 2). The communication hole 36 is a gap between a front surface of the front protective part 40 and a lower rear surface of the second protective member 32. In a cross-sectional view, the communication hole 36 is inclined such that an upper end of an opening thereof is positioned on a rearward side and a lower end of the opening is positioned on a forward side.

<Right Knuckle Guard>

Figure 18:
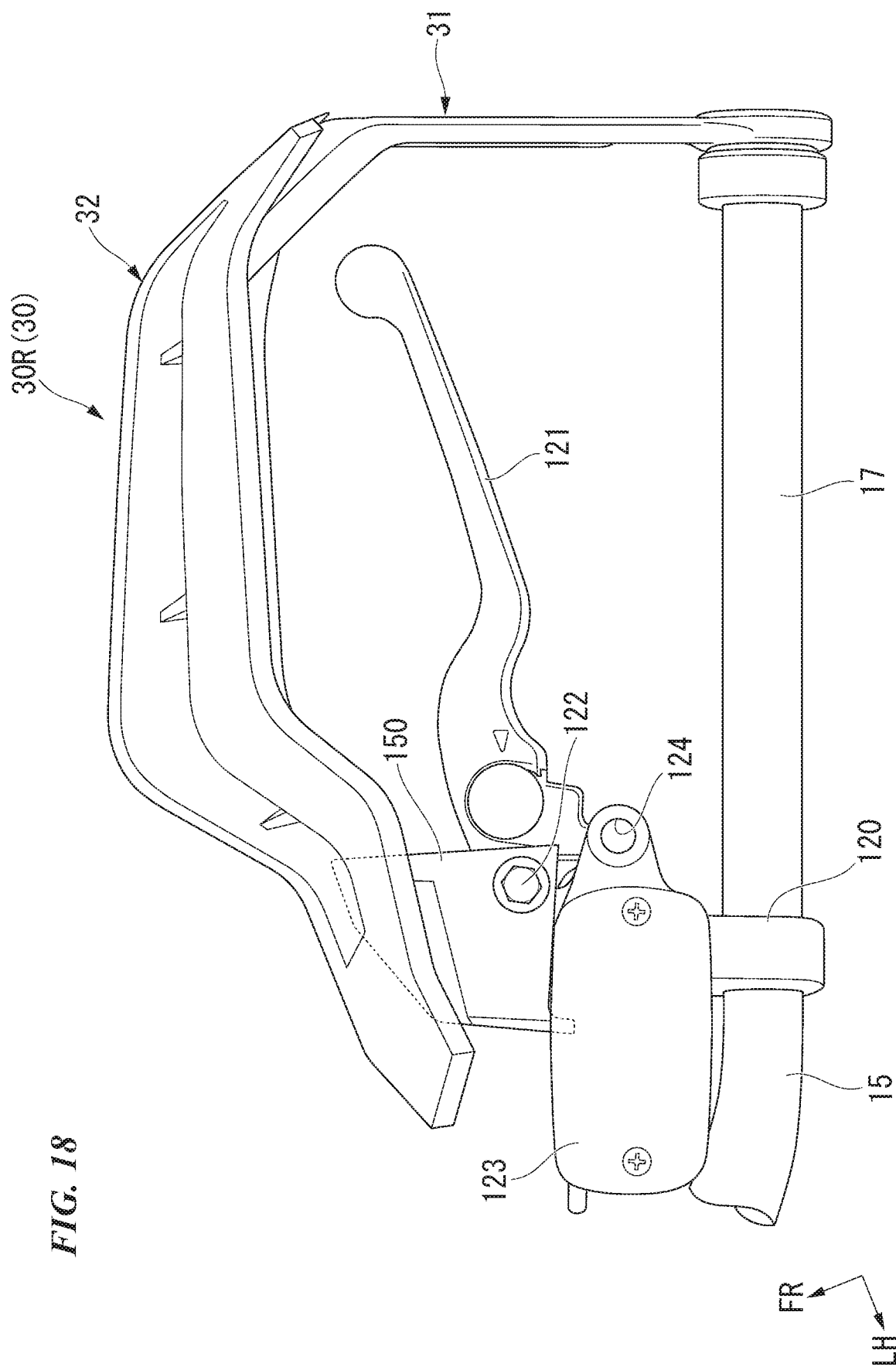
FIG. 18 is a top view of a right knuckle guard according to the embodiment.

Hereinafter, the right knuckle guard 30R will be described. In the right knuckle guard 30R, configurations the same as those in the left knuckle guard 30L are denoted by the same references, and detailed description thereof will be omitted. As shown in FIG. 18, the right knuckle guard 30R is disposed in front of the right grip 17 to straddle the right grip 17 and the handle 15. When viewed from above, the right knuckle guard 30R has a U shape that opens rearward.

In the drawing, reference 120 denotes a holder for fixing an inner end portion of the right knuckle guard 30R, reference 121 denotes a brake lever, reference 122 denotes a bolt constituting a rocking shaft of the brake lever 121, reference 123 denotes a master cylinder, and reference 124 denotes a side mirror attachment part.

Figure 19:
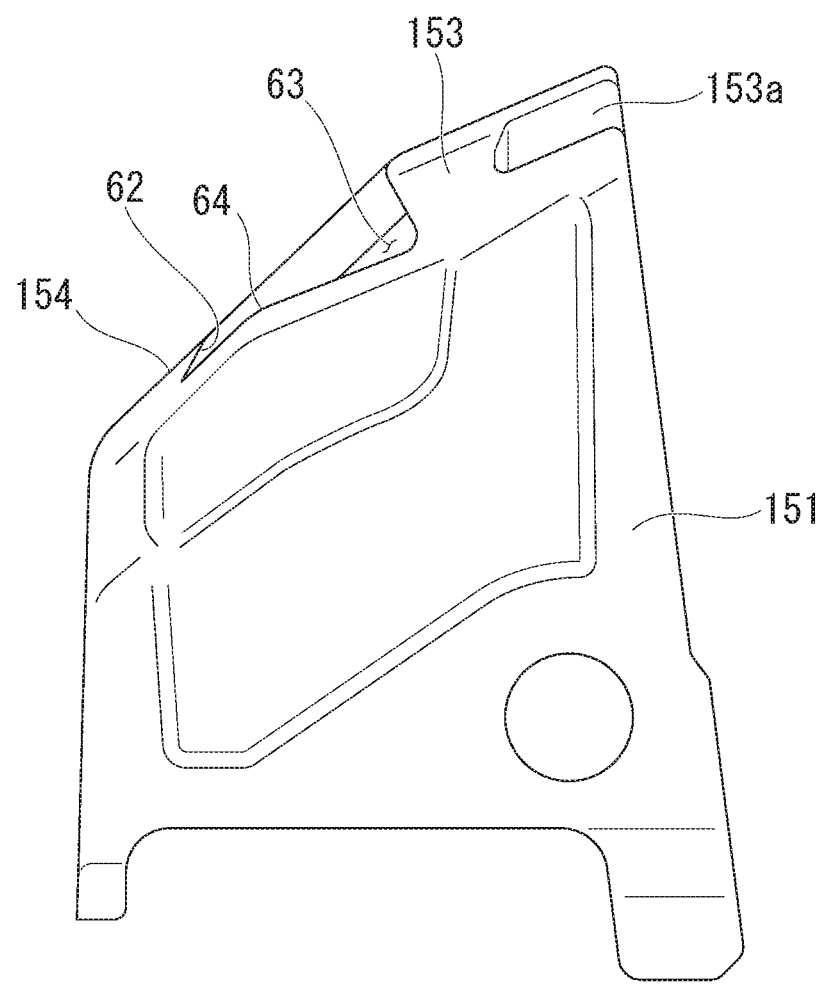
FIG. 19 is a top view of a connecting member of the right knuckle guard according to the embodiment.
Figure 20:
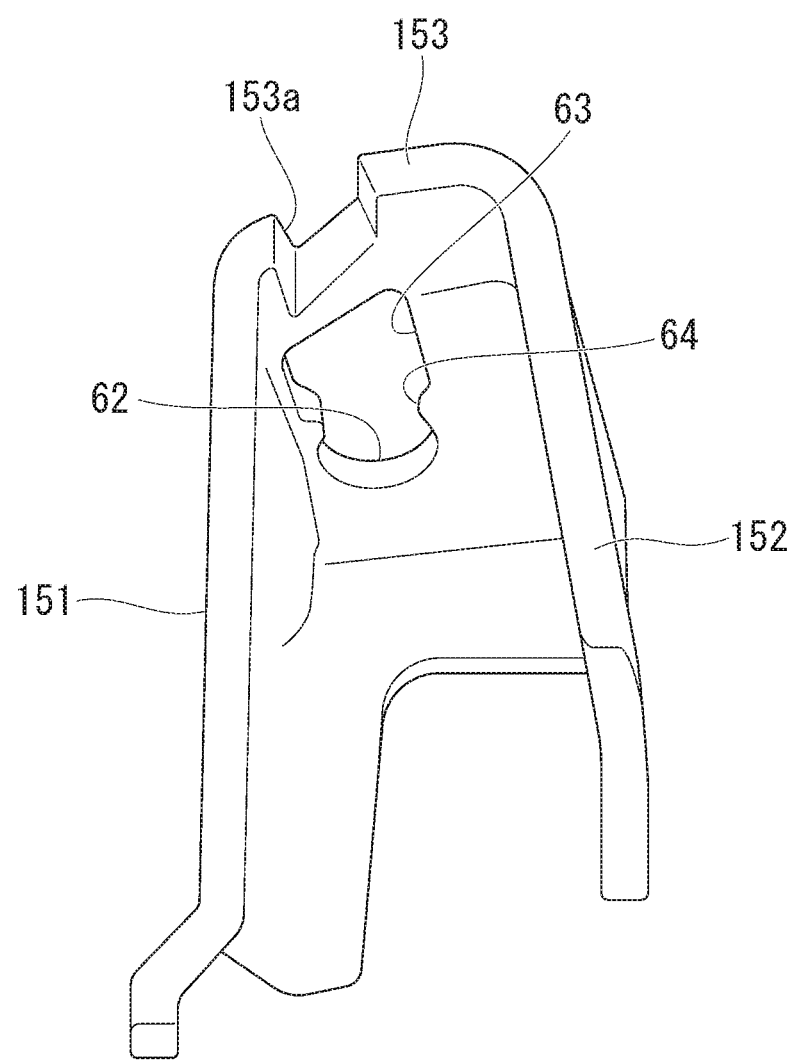
FIG. 20 is a right side view of the connecting member of the right knuckle guard according to the embodiment.

When viewed from above, a connecting member 150 (see FIG. 19) of the right knuckle guard 30R has a smaller outer shape than the connecting member 50 (see FIG. 12) of the left knuckle guard 30L. In a side view, the connecting member 150 has a U shape that opens rearward (see FIG. 20). The connecting member 150 protects a pivot part of the brake lever 121. As shown in FIG. 20, the connecting member 150 includes an upper wall part 151, a lower wall part 152, and a front wall part 153. The upper wall part 151, the lower wall part 152, and the front wall part 153 are integrally formed of the same member.

The upper wall part 151 is disposed on an upper side of the brake lever 121. When viewed from above, the upper wall part 151 has an outer shape whose left-right width increases toward the rear side (see FIG. 19).

The lower wall part 152 is disposed on a lower side of the brake lever 121. The lower wall part 152 is shorter than the upper wall part 151 in the front-rear direction.

The front wall part 153 is disposed on a front side of the brake lever 121. The front wall part 153 connects a front end of the upper wall part 151 and a front end of the lower wall part 152. The front wall part 153 has an attachment surface 154 (see FIG. 19) that is inclined inward in the vehicle width direction and rearward with respect to the front of the vehicle when viewed from above. A recessed part 153a that opens outward in the vehicle width direction is provided in the front wall part 153.

Hereinafter, respective operations of the knuckle guard 30, the second protective member 32, and the detachment structure 60 will be described by taking the left knuckle guard 30L side of the left and right knuckle guards 30L and 30R as an example. Since the right knuckle guard 30R has the same operation as the left knuckle guard 30L, detailed description thereof will be omitted.

<Operation of Knuckle Guard>

Figure 21:
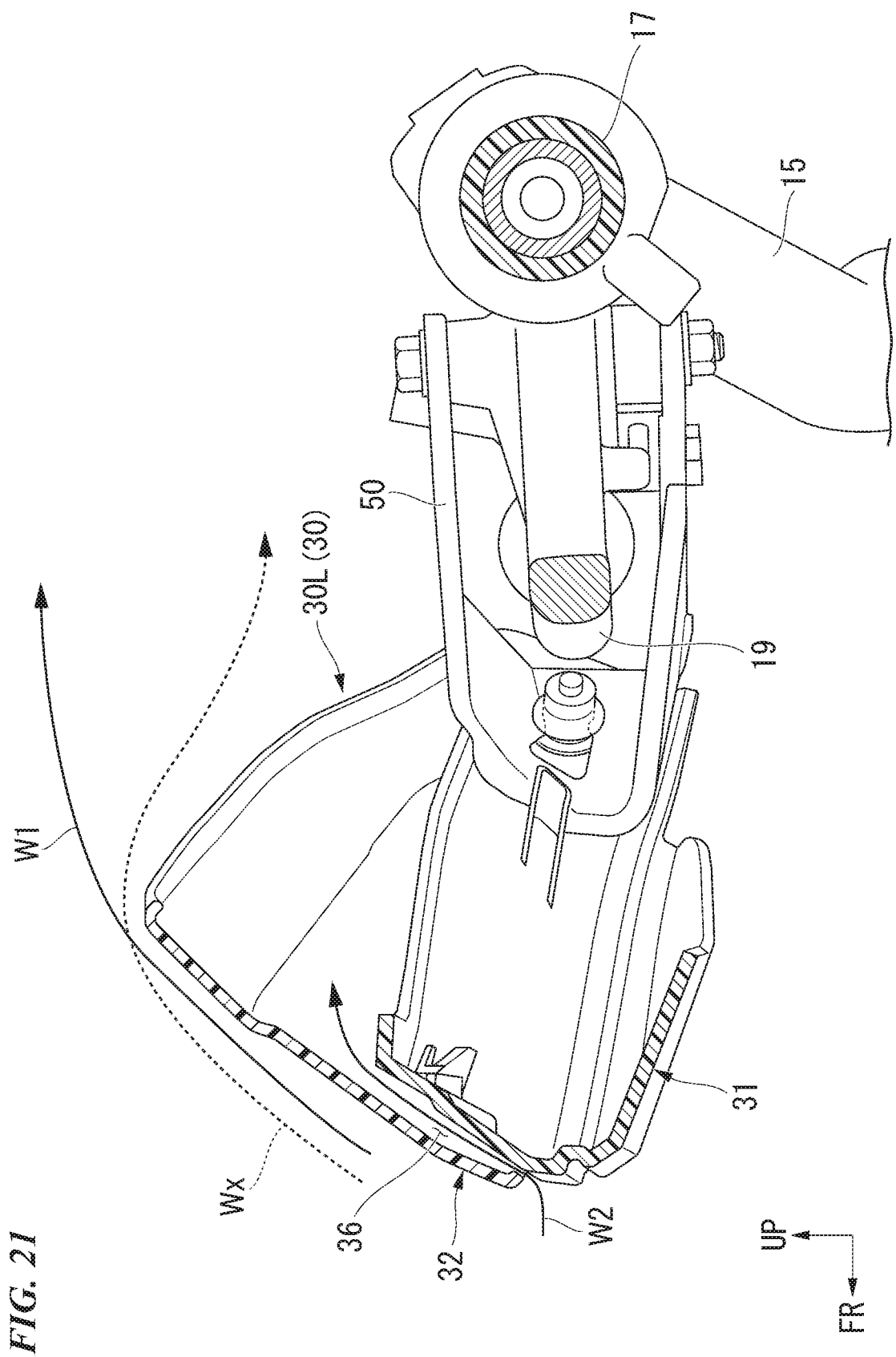
FIG. 21 is an explanatory view of an operation of the knuckle guard according to the embodiment.

With reference to FIG. 21, an operation of the knuckle guard 30 according to the embodiment will be described together with a comparative example.

The comparative example does not have the communication hole 36 according to the embodiment. Alternatively, a lower end of an opening of the communication hole 36 is closed in the comparative example. In the drawing, an arrow Wx indicates a flow of traveling wind in the comparative example, and arrows W1 and W2 indicate flows of traveling winds in the embodiment.

In the comparative example, a traveling wind flows rearward and upward along the front surface of the second protective member 32 and then enters the rear of the second protective member 32 (see arrow Wx). In the comparative example, an increase in pressure difference between the front and the rear of the knuckle guard 30 causes entrainment of a traveling wind at an upper portion of the second protective member 32.

In the embodiment, a traveling wind flows rearward and upward along the front surface of the second protective member 32 (see arrow W1) and enters the communication hole 36 from the lower end of the opening of the communication hole 36 (see arrow W2). The wind that has flowed along the front surface of the second protective member 32 flows rearward and upward from the upper edge of the second protective member 32. The wind that has entered the communication hole 36 enters the rear of the second protective member 32. In the embodiment, when a portion of the traveling wind is caused to flow to the rear of the second protective member 32, a pressure difference between the front and the rear of the knuckle guard 30 can be reduced, and entrainment of the traveling wind can be inhibited.

<Operation of Second Protective Member According to Embodiment>

Figure 23:
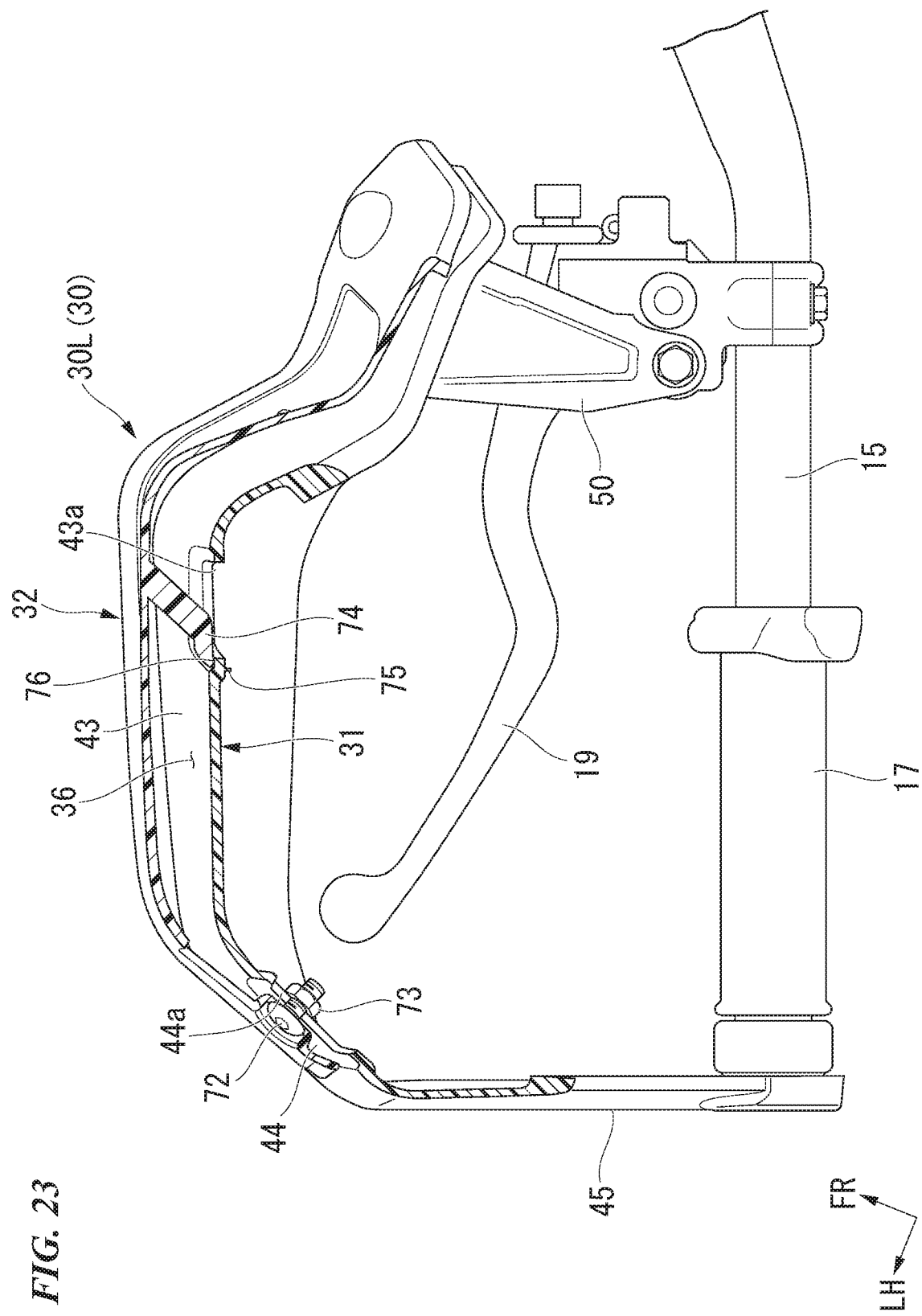
FIG. 23 continues from FIG. 22 and is an explanatory view of the operation of the second protective member.

With reference to FIGS. 22 and 23, an operation of the second protective member 32 according to the embodiment will be described.

The second protective member 32 can enlarge the communication hole 36 by being bent inward in the vehicle width direction along the attachment hole 44a of the first protective member 31.

FIG. 22 shows an initial state before the second protective member 32 is bent. In FIG. 22, the bolt 72 inserted through the through hole 32a (see FIG. 15) of an outer portion in the vehicle width direction of the second protective member 32 is fixed on an outer side in the vehicle width direction of the attachment hole 44a of the fourth extended part 44. In FIG. 22, the engaging claw 74 is engaged with an opening edge portion (hereinafter referred to as a "claw insertion hole forming part") of the claw insertion hole 43a of the third extended part 43.

Figure 16:
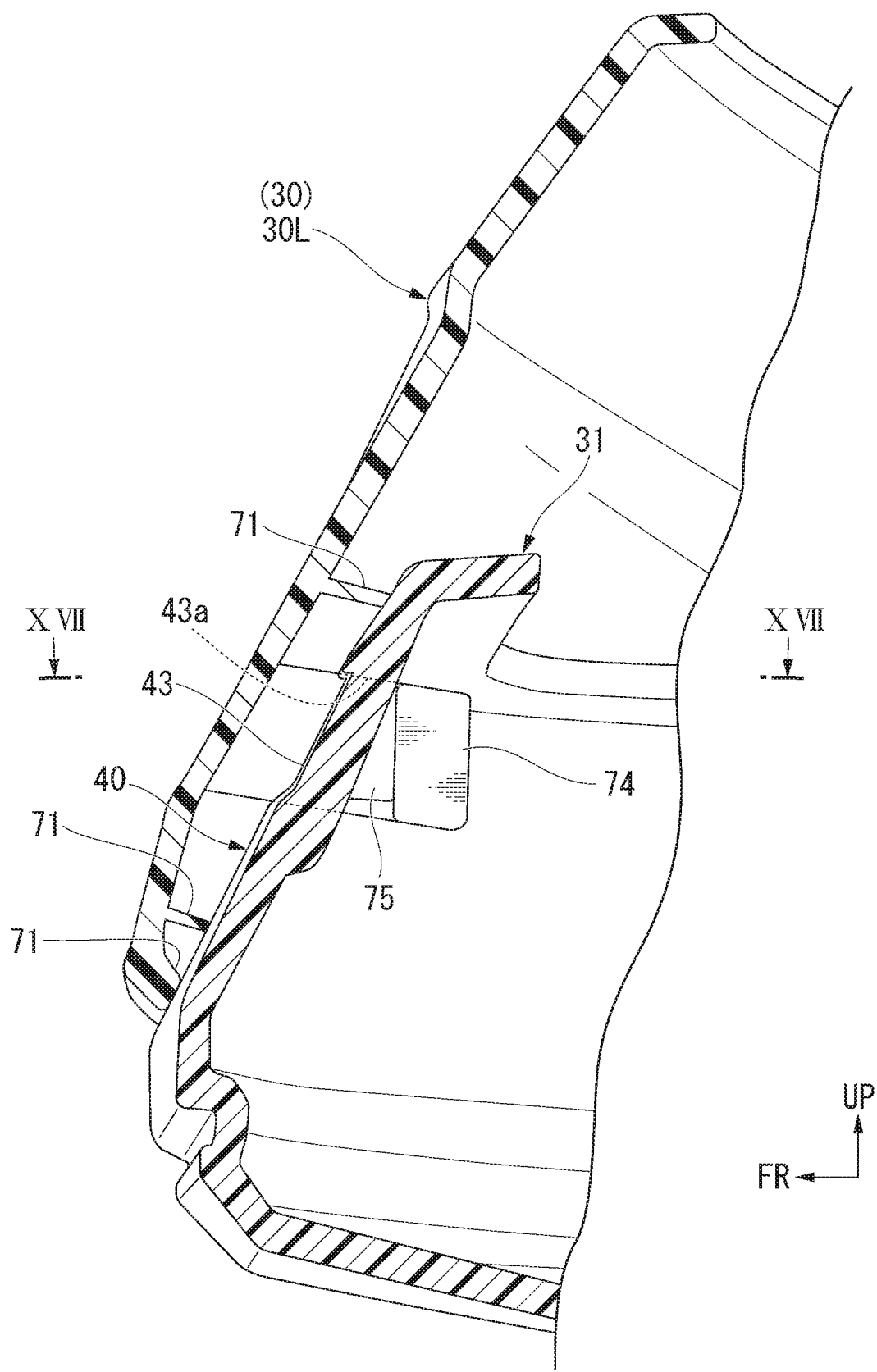
FIG. 16 is a view including a cross section along line XVI-XVI of FIG. 5.
Figure 17:
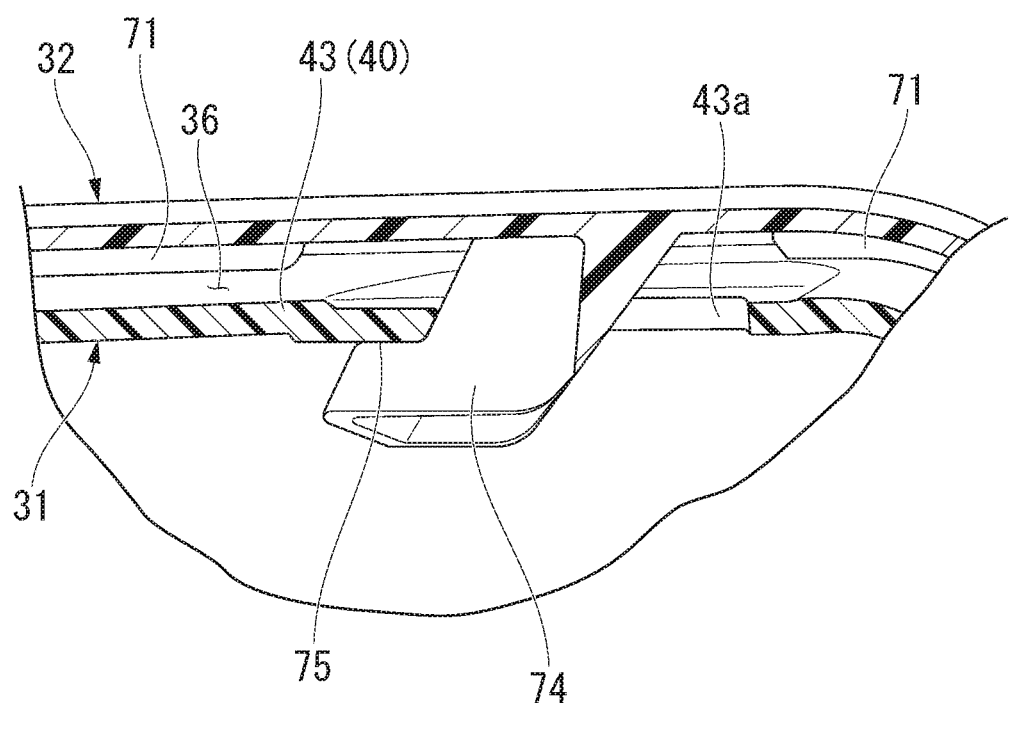
FIG. 17 is a view including a cross section along line XVII-XVII of FIG. 16.

As shown in FIG. 16, an engagement protruding part 75 which functions as a positioning part together with the engaging claw 74 is provided in the claw insertion hole forming part. In a side view, the engagement protruding part 75 has a triangular shape that protrudes downward from a rear surface (inclined surface) of the first protective member 31. In the initial state, the engaging claw 74 is in contact with a rear surface of the engagement protruding part 75. In the initial state, movement of the second protective member 32 forward and outward in the vehicle width direction with respect to the first protective member 31 is restricted (see FIG. 17) by the engaging claw 74 engaged with the claw insertion hole forming part (engagement protruding part 75).

In FIG. 16, reference 71 indicates a positioning protruding part that defines a front-rear interval between the first protective member 31 and the second protective member 32 in the initial state. A plurality of (three in the drawing) positioning protruding parts 71 are provided at intervals in the vertical direction. The positioning protruding parts 71 are provided at intervals in the vehicle width direction. A gap between two positioning protruding parts 71 adjacent to each other in the vehicle width direction forms the communication hole 36 (see FIG. 7).

FIG. 23 shows a state in which the second protective member 32 is bent. In FIG. 23, the bolt 72 inserted through the through hole 32a (see FIG. 15) of the outer portion in the vehicle width direction of the second protective member 32 is fixed on an inner side in the vehicle width direction of the attachment hole 44a of the fourth extended part 44. A two-dot dashed line in FIG. 15 shows a state in which the second protective member 32 is bent in a curved shape which is convex forward.

For example, the second protective member 32 is bent to have a curved shape which is convex forward by shifting the outer portion in the vehicle width direction of the second protective member 32 inward in the vehicle width direction while the inner portion in the vehicle width direction of the second protective member 32 is fastened. The engaging claw 74 is brought into contact with a stepped part 76 on a front surface of the third extended part 43 without being engaged with the claw insertion hole forming part. Then, the outer portion in the vehicle width direction of the second protective member 32 is fastened in a state in which the second protective member 32 is bent. Thereby, the communication hole 36 can be enlarged from the initial state of FIG. 23.

<Operation of Detachment Structure According to Embodiment>

An operation of the detachment structure 60 according to the embodiment will be described with reference to FIG. 24. In FIG. 24, illustrations of the second protective member 32 will be omitted.

The detachment structure 60 detaches the guard member 39 forward from the connecting member 50 when a load exceeding a set value is applied to the guard member 39 from behind.

A two-dot dashed line in FIG. 24 shows an attached state before the guard member 39 is detached from the connecting member 50. In the attached state, the elastic protruding part 61 is positioned in the protruding part holding hole 62 (see FIG. 8). In the attached state, the narrow-constricted part 64 restricts outward movement of the elastic protruding part 61 in the vehicle width direction (see FIG. 8).

A solid line in FIG. 24 shows a detached state in which the guard member 39 is detached from the connecting member 50.

When a load exceeding the set value is applied to the guard member 39 from behind, the elastic protruding part 61 rides over the narrow-constricted part 64 and moves from the protruding part holding hole 62 toward the protruding part detaching hole 63. When the elastic protruding part 61 moves to the protruding part detaching hole 63, the elastic protruding part 61 comes forward out of the protruding part detaching hole 63. Thereby, the guard member 39 can be detached forward from the connecting member 50 when a load exceeding the set value is applied to the guard member 39 from behind.

As described above, the knuckle guard 30 in the above-described embodiment includes the guard member 39 disposed in front of the grip 17 of the handle 15 of the vehicle, the connecting member 50 connected to the guard member 39, and the detachment structure 60 provided in the attachment part between the guard member 39 and the connecting member 50 and configured to detach the guard member 39 forward from the connecting member 50 when a load exceeding a set value is applied to the guard member 39 from behind, in which the detachment structure 60 is provided in the inner portion in the vehicle width direction of the guard member 39.

According to the present embodiment, when the detachment structure 60 is provided in the inner portion in the vehicle width direction of the guard member 39, since the guard member 39 is not easily detached from the connecting member 50 by a load from the front and lateral sides of the vehicle, it is possible to withstand impacts from the front and lateral sides of the vehicle. In addition, since the guard member 39 is detached forward from the connecting member 50 when a load exceeding an installation value is applied to the guard member 39 from behind, rider's body is not easily restricted by the grip 17 and the knuckle guard 30. Accordingly, a rider's knuckle region can be better protected.

The detachment structure 60 includes the elastic protruding part 61 which protrudes rearward from the guard member 39 and is elastically deformable, the protruding part holding hole 62 provided in the connecting member 50 for attachment of the elastic protruding part 61, and the protruding part detaching hole 63 continuous with the protruding part holding hole 62 for detachment of the elastic protruding part 61, and the protruding part holding hole 62 achieves the following effects by being provided on a rearward side of the protruding part detaching hole 63.

According to this configuration, when the guard member 39 and the connecting member 50 are attached with a certain fastening force and a load exceeding an installation value is applied to the guard member 39 from behind, the elastic protruding part 61 moves from the protruding part holding hole 62 to the protruding part detaching hole 63 and the guard member 39 is detached from the connecting member 50. Therefore, a possibility of parts being damaged is low, and reassembling of the parts is possible.

The connecting member 50 includes the attachment surface 54 inclined inward in the vehicle width direction and rearward with respect to the front of the vehicle when viewed from above, the protruding part holding hole 62 and the protruding part detaching hole 63 are provided on the attachment surface 54, the elastic protruding part 61 is held by the protruding part holding hole 62 from the front of the attachment surface 54, and thereby the following effects are achieved.

According to this configuration, when a load exceeding the installation value is applied to the guard member 39 from behind, the load from behind changes in a direction in which the guard member 39 is detached and comes out due to the inclination of the attachment surface 54, and thereby the guard member 39 is detached. In addition, a load with which the guard member 39 is detached can be set by adjusting an inclination angle of the attachment surface 54.

The protruding part holding hole 62 and the protruding part detaching hole 63 have a continuous shape, the protruding part detaching hole 63 is larger than the protruding part holding hole 62, the protruding part holding hole 62 is continuous with the protruding part detaching hole 63 via the narrow-constricted part 64 that is smaller than the protruding part holding hole 62, and thereby the following effects are achieved.

According to this configuration, a removal load of the guard member 39 can be set by setting a width of the narrow-constricted part 64.

The detachment structure 60 further includes a fastening member which fastens together the guard member 39 and the connecting member 50 by elastically deforming the elastic protruding part 61, and thereby the following effects are achieved.

According to this configuration, the guard member 39 and the connecting member 50 can be fastened by elastic deformation of the elastic protruding part 61, and the guard member 39 can be detached from the connecting member 50 when a load is applied in a constant direction. Therefore, a set load (a removal load of the guard member 39) can be adjusted.

The knuckle guard 30 includes the airflow guide part 35 having a communication hole 36 that opens in the vertical direction, the airflow guide part 35 covers the communication hole 36 in a front view, and thereby the following effects are achieved.

According to this configuration, since the airflow guide part 35 covers the communication hole 36 in a front view, there is no opening toward the front of the vehicle. Therefore, rider's knuckle region and arm region can be protected from wind, water, dirt, sand, tree branches, or the like during traveling by the airflow guide part 35. Therefore, effects of protection against wind, dust, gravel, and tree branches during traveling are inhibited from being impaired. In addition, since the airflow guide part 35 having the communication hole 36 disposed in front of the grip 17 of the handle 15 of the vehicle and opening in the vertical direction is provided, a negative pressure behind the knuckle guard 30 can be corrected by the communication hole 36. Therefore, a larger effect of protection against wind can be obtained with a smaller front surface projection area. In addition, since the communication hole 36 is not seen in a front view, it creates a sense of unity of the knuckle guard 30 and is excellent in design.

The knuckle guard 30 includes the first protective member 31 disposed in front of the grip 17 and the second protective member 32 disposed in front of the first protective member 31, the first protective member 31 and the second protective member 32 form the layered part 37 in which the protective members overlap each other, the communication hole 36 causes the layered part 37 to open in the vertical direction, and thereby the following effects are achieved.

According to this configuration, since the knuckle guard 30 is made to have a divided structure and the communication hole 36 is formed by the layered part 37 of individual divided parts (the first protective member 31 and the second protective member 32), the knuckle guard 30 is inhibited from having a complicated structure, and the knuckle guard 30 can be easily formed.

The first protective member 31 includes the attachment hole 44a for attachment of the second protective member 32, the attachment hole 44a is a long hole having a longitudinal dimension in the vehicle width direction, the second protective member 32 can enlarge the communication hole 36 by being bent inward in the vehicle width direction along the attachment hole 44a, and thereby the following effects are achieved.

According to this configuration, when the communication hole 36 (gap) of the layered part 37 is enlarged by bending the second protective member 32 inward in the vehicle width direction and fixing it on the inner side in the vehicle width direction of the attachment hole 44a of the first protective member 31, an air flow rate (an air flow rate for correcting a negative pressure behind the knuckle guard 30) toward the rear of the knuckle guard 30 can be adjusted. Therefore, the negative pressure behind the knuckle guard 30 is easily adjusted according to rider's preference in which traveling conditions such as a traveling speed and a temperature (including an ambient temperature), and the like are taken into account.

Between the first protective member 31 and the second protective member 32, the positioning part 74 that defines positions therebetween in the attachment hole 44a is provided, and thereby the following effects are achieved.

According to this configuration, a relative position between the first protective member 31 and the second protective member 32 can be defined.

The first protective member 31 includes the claw insertion hole 43a that is a long hole having a longitudinal dimension in the vehicle width direction, the engaging claw 74 that can be inserted through the claw insertion hole 43a of the first protective member 31 as the positioning part 74 is provided in the second protective member 32, the engaging claw 74 has an L shape extending obliquely rearward and outward from the rear surface of the second protective member 32, the engaging claw 74 engages with the opening edge portion of the claw insertion hole 43a of the first protective member 31 in an initial state before the second protective member 32 is bent, the engaging claw 74 is in contact with the stepped part 76 on a front surface of the first protective member 31 in a state in which the second protective member 32 is bent in a curved shape which is convex forward, and thereby the following effects are achieved.

According to this configuration, a relative position between the first protective member 31 and the second protective member 32 can be defined in each of the initial state and the curved state of the second protective member 32.

The second protective member 32 is attachable to and detachable from the first protective member 31, and thereby the following effects are achieved.

According to this configuration, only the first protective member 31 can be used by removing the second protective member 32 from the first protective member 31. The second protective member 32 may be attached to the first protective member 31 for traveling, for example, during long-distance traveling or off-road traveling. Only the first protective member 31 may be used for traveling, for example, during low-speed traveling or on-road traveling in an urban area. Depending on a difference in temperature, for example, when the temperature is low, the second protective member 32 may be attached to the first protective member 31 for traveling. For example, when the temperature is high, only the first protective member 31 may be used for traveling. Thus, since specifications of the knuckle guard 30 can be changed according to such a condition, a degree of freedom in specification change is improved.

In addition, since specifications can be changed by adding only a portion of the parts without replacing the entire knuckle guard 30 with another one, the costs of parts can be reduced. In addition, when the first protective member 31 includes the attachment hole 44a for attachment of the second protective member 32, the attachment hole 44a can be functioned as an airflow guide hole.

<Modified Example>

In the above-described embodiment, an example in which the communication hole 36 causes the entire layered part 37 in which the first protective member 31 and the second protective member 32 overlap each other in a front view to open in the vertical direction has been described, but the present invention is not limited thereto. For example, the communication hole 36 may cause a portion of the layered part 37 to open in the vertical direction. The communication hole 36 may cause at least a portion of the layered part 37 to open in the vertical direction.

In the above-described embodiment, an example in which the knuckle guard 30 is made to have a divided structure and includes individual divided parts (the first protective member 31 and the second protective member 32), has been described, but the present invention is not limited thereto. For example, the knuckle guard 30 may not have a divided structure and may include only one protective member.

In the above-described embodiment, an example in which the second protective member 32 is attachable to and detachable from the first protective member 31 has been described, but the present invention is not limited thereto. For example, the second protective member 32 may be integrated with the first protective member 31 without being attachable to and detachable from the first protective member 31.

In the above-described embodiment, an example in which the front protective part 40 and the lateral side protective part 45 are integrally formed of the same member has been described, but the present invention is not limited thereto. For example, the front protective part 40 and the lateral side protective part 45 may be formed of different members. For example, the lateral side protective part 45 may be fastened to the front protective part 40 with a bolt or the like.

In the above-described embodiment, an example in which the handle 15 to which the knuckle guard 30 is attached is a bar handle has been described, but the present invention is not limited thereto. For example, the handle 15 to which the knuckle guard 30 is attached may be a so-called separate handle that is separated left and right. For example, in a separate handle including a base part fixed to the top bridge 5 and a pipe-shaped part extending in the vehicle width direction, the knuckle guard 30 may be attached after a weight is inserted through the pipe-shaped part.

The present invention is not limited to the embodiment described above, and the straddle-type vehicle described above includes general vehicles on which a driver straddles the vehicle body to ride and includes not only motorcycles (such as motorized bicycle and scooter type vehicle) but also three-wheeled vehicles (such as vehicles with two front wheels and one rear wheel as well as vehicles with one front wheel and two rear wheels) or four-wheeled vehicles.

The configurations in the embodiment described above are examples of the present invention, and various changes can be made without departing from the scope of the present invention such as replacing the components of the embodiment with well-known components.

What is claimed is:

1. A knuckle guard comprising:
   a guard member disposed in front of a grip of a handle of a straddle-type vehicle;
   a connecting member connected to the guard member; and
   a detachment structure provided in between the guard member and the connecting member and detaches the guard member forward from the connecting member when a load exceeding a set value is applied to the guard member from behind, wherein
   the detachment structure is provided in an inner portion in a vehicle width direction of the guard member, wherein
   the detachment structure includes:
   an elastic protruding part which protrudes rearward from the guard member and is elastically deformable;
   a protruding part holding hole provided in the connecting member for attachment of the elastic protruding part; and
   a protruding part detaching hole continuous with the protruding part holding hole for detachment of the elastic protruding part, and
   the protruding part holding hole is provided on a rearward side of the protruding part detaching hole, wherein
   the protruding part detaching hole is arranged on an outside of the protruding part holding hole in the vehicle width direction.

2. The knuckle guard according to claim 1, wherein
   the connecting member includes an attachment surface inclined inward in the vehicle width direction and rearward with respect to a front of the vehicle when viewed from above,
   the protruding part holding hole and the protruding part detaching hole are provided on the attachment surface, and
   the elastic protruding part is held by the protruding part holding hole from a front of the attachment surface.

3. The knuckle guard according to claim 1, wherein
   the protruding part holding hole and the protruding part detaching hole have a continuous shape,
   the protruding part detaching hole is larger than the protruding part holding hole, and
   the protruding part holding hole is continuous with the protruding part detaching hole via a narrow-constricted part which is smaller than the protruding part holding hole.

4. The knuckle guard according to claims 1, wherein the detachment structure further includes a fastening member which fastens together the guard member and the connecting member by elastically deforming the elastic protruding part.

* * * * *